US012651484B2

(12) United States Patent
Wang et al.

(10) Patent No.: US 12,651,484 B2
(45) Date of Patent: Jun. 9, 2026

(54) IMAGE DATA PROCESSING METHOD, IMAGE DATA RECOGNITION METHOD, TRAINING METHOD FOR IMAGE RECOGNITION MODEL, IMAGE DATA PROCESSING APPARATUS, TRAINING APPARATUS FOR IMAGE RECOGNITION MODEL, AND IMAGE RECOGNITION APPARATUS

(71) Applicant: Alipay (Hangzhou) Information Technology Co., Ltd., Hangzhou (CN)

(72) Inventors: Yinggui Wang, Hangzhou (CN); Li Wang, Hangzhou (CN); Lei Wang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 306 days.

(21) Appl. No.: 18/478,842

(22) Filed: Sep. 29, 2023

(65) Prior Publication Data

US 2024/0119758 A1     Apr. 11, 2024

(30) Foreign Application Priority Data

Sep. 30, 2022    (CN) .......................... 202211215209.0

(51) Int. Cl.
*G06V 40/50*          (2022.01)
*G06F 21/62*          (2013.01)
(Continued)
(52) U.S. Cl.
CPC .......... *G06V 40/53* (2022.01); *G06F 21/6254* (2013.01); *G06T 5/10* (2013.01);
(Continued)

(58) Field of Classification Search
CPC .. G06V 40/53; G06V 10/7715; G06V 10/774; G06V 40/168; G06V 40/172;
(Continued)

(56) References Cited

U.S. PATENT DOCUMENTS 11,687,780 B2    6/2023  Liu et al.
2022/0004827 A1*  1/2022  Liu .......................... G06N 3/09
(Continued)

FOREIGN PATENT DOCUMENTS

CN       116704296 A    9/2023
CN       118506456 B   10/2024

OTHER PUBLICATIONS

Ji et al., "Privacy-Preserving Face Recognition with Learnable Privacy Budgets in Frequency Domain," Jul. 19, 2022. (Year: 2022).*

*Primary Examiner* — Phuoc Tran
(74) *Attorney, Agent, or Firm* — Seed IP Law Group LLP

(57) ABSTRACT

Implementations of the present specification provide an image data processing method, an image data recognition method, a training method for an image recognition model, an image data processing apparatus, an image data recognition apparatus, and a training apparatus for an image recognition model. During image data processing, data anonymization processing is performed on image data based on frequency domain transform to obtain anonymized image data of the image data. The obtained anonymized image data includes a subgraph data set. Each subgraph data in the subgraph data set corresponds to a different frequency. Then, image blending processing is performed on the obtained anonymized image data based on data augmentation, to obtain augmented anonymized image data. In some implementations, graph size alignment processing is performed on each subgraph data in the augmented anonymized image (Continued)

1000

Obtain image data that serves as a training sample and a label
1010

Perform image data processing on the image data, to obtain augmented anonymized image data 1020

Perform label blending processing on corresponding labels of each anonymized image data by using weight coefficients of each anonymized image data 1030

Train an image recognition model by using the anonymized image data and the labels of the anonymized image data that have undergone the label blending processing 1040 data, so that a size of each subgraph data after the graph size alignment processing is same as a size of the image data in original form.

20 Claims, 17 Drawing Sheets

(51) Int. Cl.

| | |
|---|---|
| *G06T 5/10* | (2006.01) |
| *G06T 5/50* | (2006.01) |
| *G06V 10/77* | (2022.01) |
| *G06V 10/774* | (2022.01) |
| *G06V 40/16* | (2022.01) |

(52) U.S. Cl.
CPC ............ *G06T 5/50* (2013.01); *G06V 10/7715* (2022.01); *G06V 10/774* (2022.01); *G06V 40/168* (2022.01); *G06V 40/172* (2022.01);
*G06T 2207/20072* (2013.01); *G06T 2207/20081* (2013.01); *G06T 2207/30201* (2013.01)

(58) Field of Classification Search
CPC ...... G06V 10/44; G06V 10/764; G06V 10/82; G06F 21/6254; G06T 5/10; G06T 5/50; G06T 2207/20072; G06T 2207/20081; G06T 2207/30201; G06N 3/08
See application file for complete search history.

(56) References Cited

U.S. PATENT DOCUMENTS

| | | | |
|---|---|---|---|
| 2022/0172416 A1* | 6/2022 | Kuta | ...................... G06V 10/82 |
| 2022/0335252 A1* | 10/2022 | Georgievskaya | ....... G06T 11/60 |

* cited by examiner

100

Figure 3:
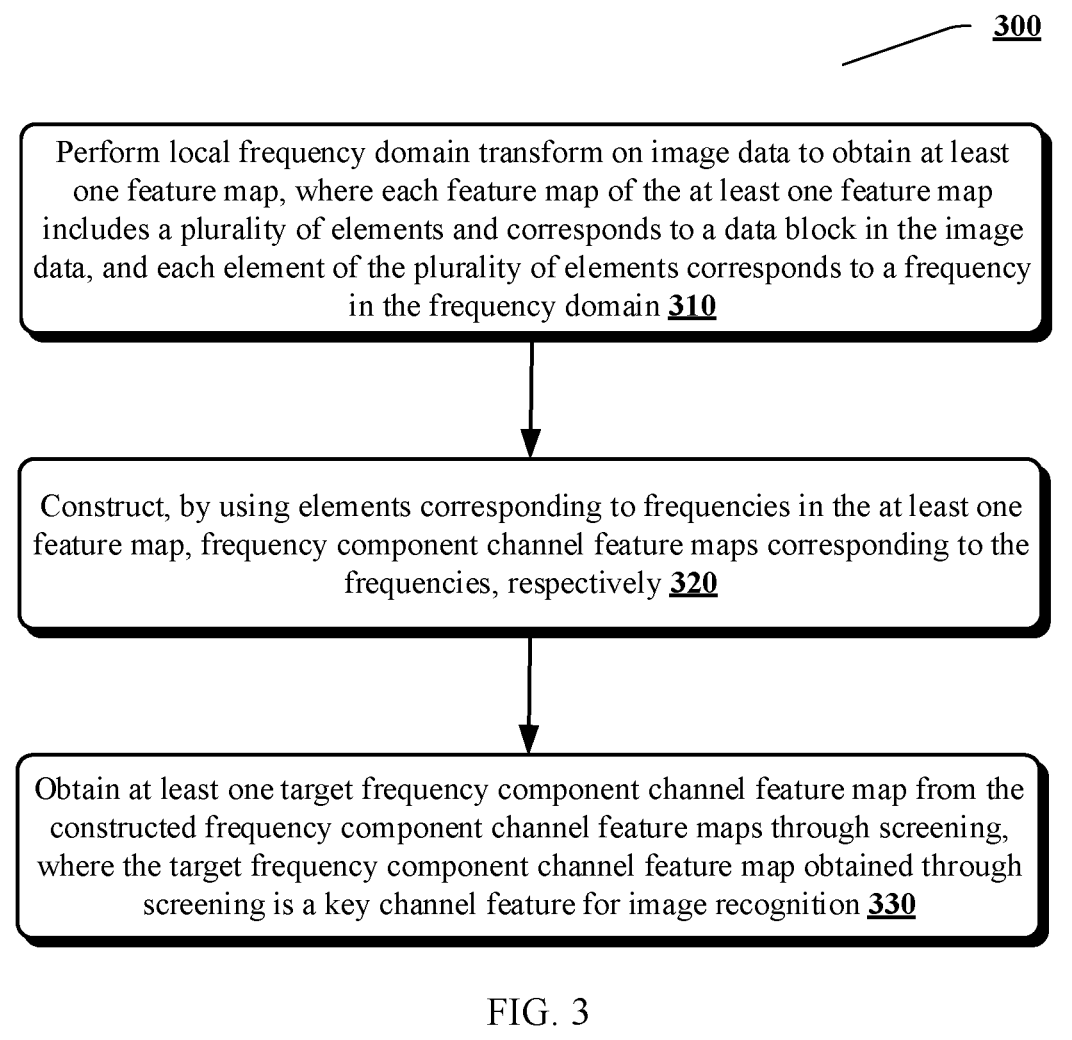

_300_

Perform local frequency domain transform on image data to obtain at least one feature map, where each feature map of the at least one feature map includes a plurality of elements and corresponds to a data block in the image data, and each element of the plurality of elements corresponds to a frequency in the frequency domain 310

Construct, by using elements corresponding to frequencies in the at least one feature map, frequency component channel feature maps corresponding to the frequencies, respectively 320

Obtain at least one target frequency component channel feature map from the constructed frequency component channel feature maps through screening, where the target frequency component channel feature map obtained through screening is a key channel feature for image recognition 330

Space domain    N*M

Frequency domain    N*M

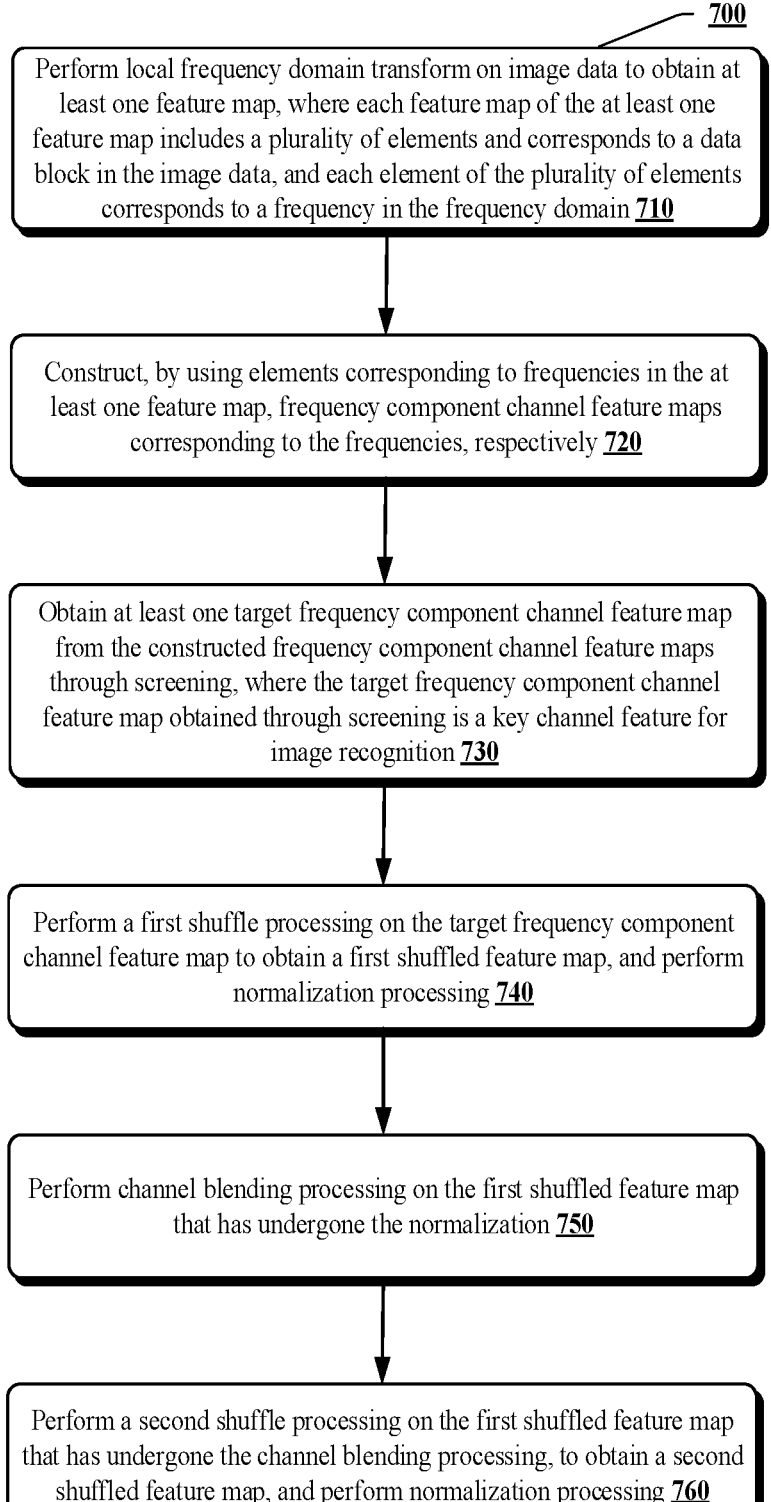

700

Perform local frequency domain transform on image data to obtain at least one feature map, where each feature map of the at least one feature map includes a plurality of elements and corresponds to a data block in the image data, and each element of the plurality of elements corresponds to a frequency in the frequency domain 710

Construct, by using elements corresponding to frequencies in the at least one feature map, frequency component channel feature maps corresponding to the frequencies, respectively 720

Obtain at least one target frequency component channel feature map from the constructed frequency component channel feature maps through screening, where the target frequency component channel feature map obtained through screening is a key channel feature for image recognition 730

Perform a first shuffle processing on the target frequency component channel feature map to obtain a first shuffled feature map, and perform normalization processing 740

Perform channel blending processing on the first shuffled feature map that has undergone the normalization 750

Perform a second shuffle processing on the first shuffled feature map that has undergone the channel blending processing, to obtain a second shuffled feature map, and perform normalization processing 760

FIG. 7

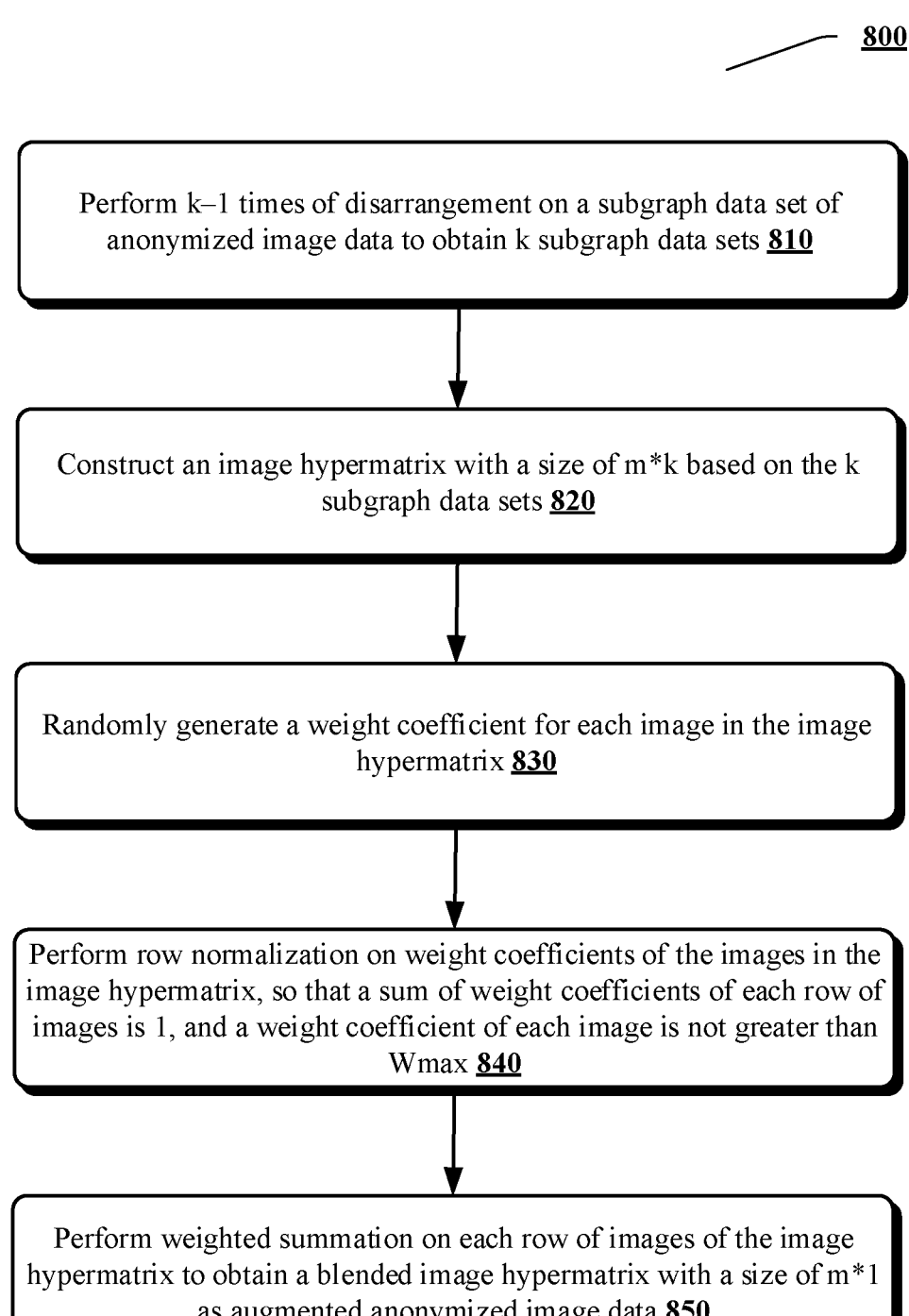

800

Perform k–1 times of disarrangement on a subgraph data set of anonymized image data to obtain k subgraph data sets 810

Construct an image hypermatrix with a size of m*k based on the k subgraph data sets 820

Randomly generate a weight coefficient for each image in the image hypermatrix 830

Perform row normalization on weight coefficients of the images in the image hypermatrix, so that a sum of weight coefficients of each row of images is 1, and a weight coefficient of each image is not greater than Wmax 840

Perform weighted summation on each row of images of the image hypermatrix to obtain a blended image hypermatrix with a size of m*1 as augmented anonymized image data 850

FIG. 8

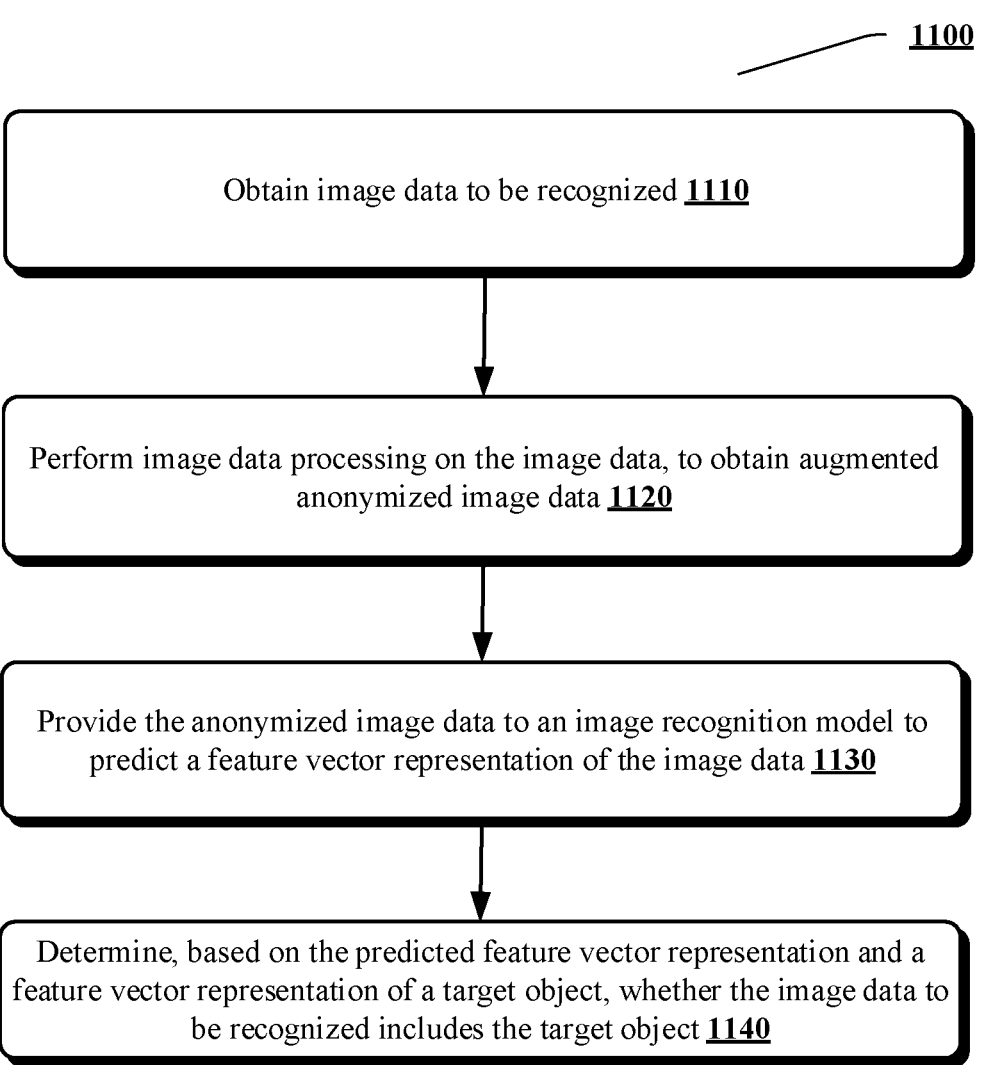

1100

Obtain image data to be recognized 1110

Perform image data processing on the image data, to obtain augmented anonymized image data 1120

Provide the anonymized image data to an image recognition model to predict a feature vector representation of the image data 1130

Determine, based on the predicted feature vector representation and a feature vector representation of a target object, whether the image data to be recognized includes the target object 1140

FIG. 11

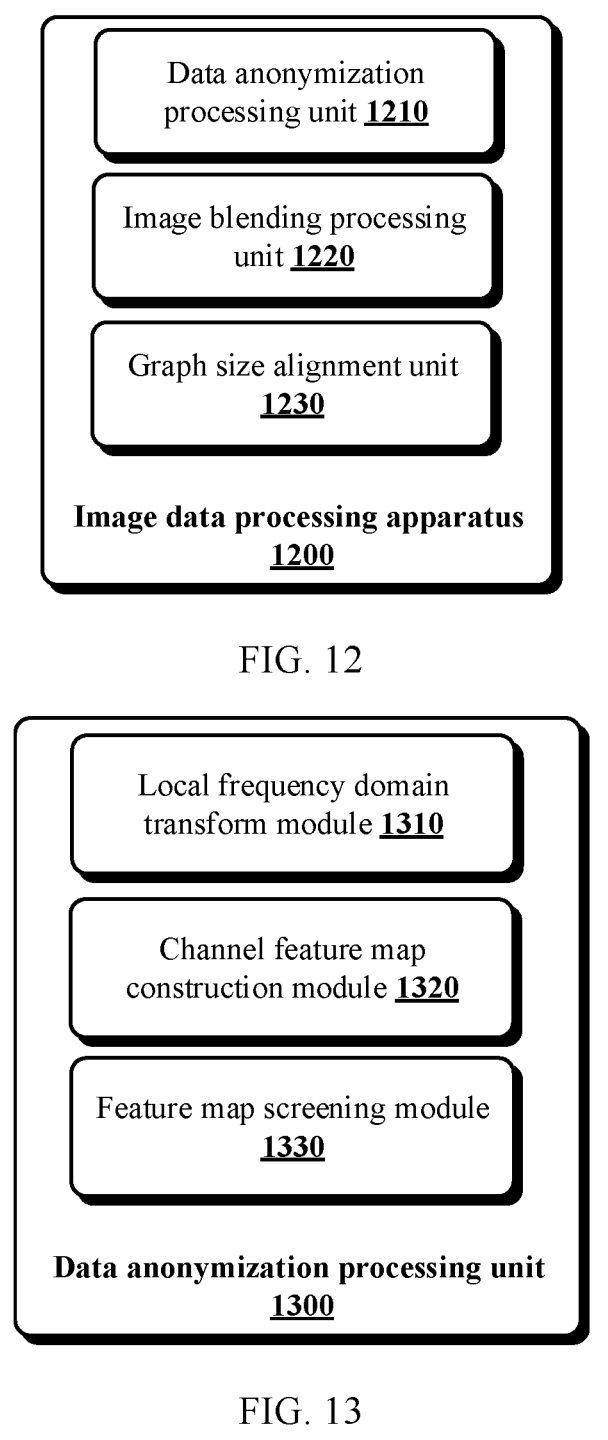

Data anonymization
processing unit 1210

Image blending processing
unit 1220

Graph size alignment unit
1230

Image data processing apparatus
1200

FIG. 12

Local frequency domain
transform module 1310

Channel feature map
construction module 1320

Feature map screening module
1330

Data anonymization processing unit
1300

FIG. 13

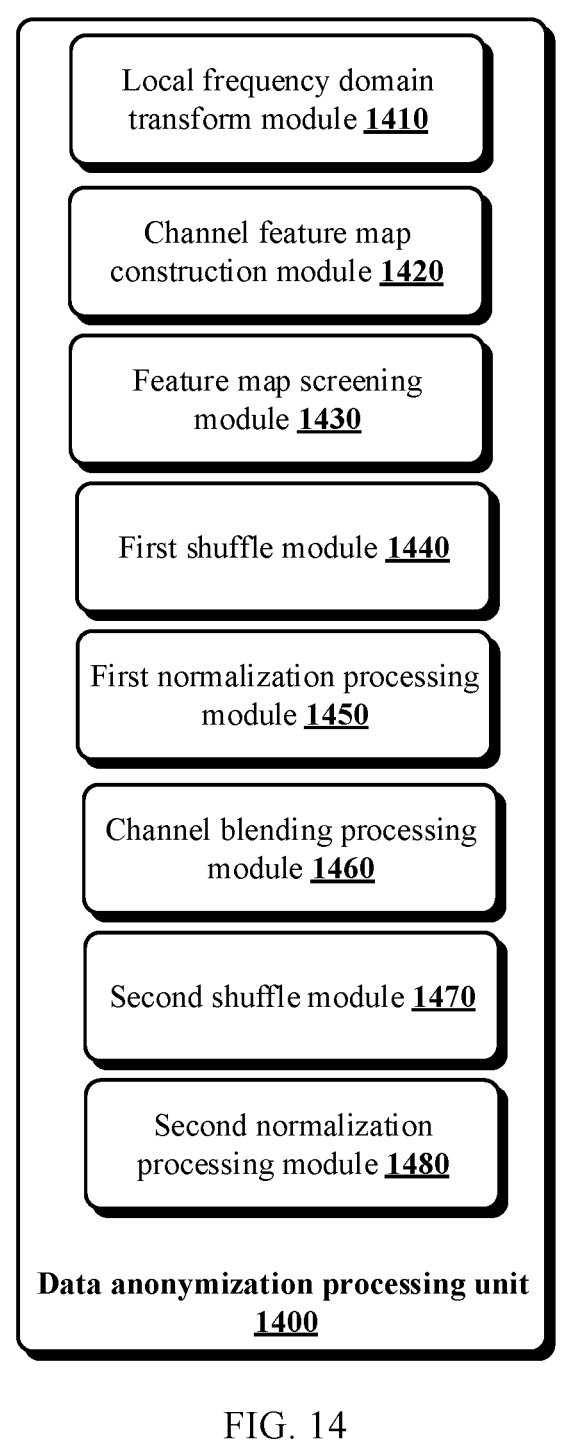

Local frequency domain
transform module 1410

Channel feature map
construction module 1420

Feature map screening
module 1430

First shuffle module 1440

First normalization processing
module 1450

Channel blending processing
module 1460

Second shuffle module 1470

Second normalization
processing module 1480

Data anonymization processing unit
1400

FIG. 14

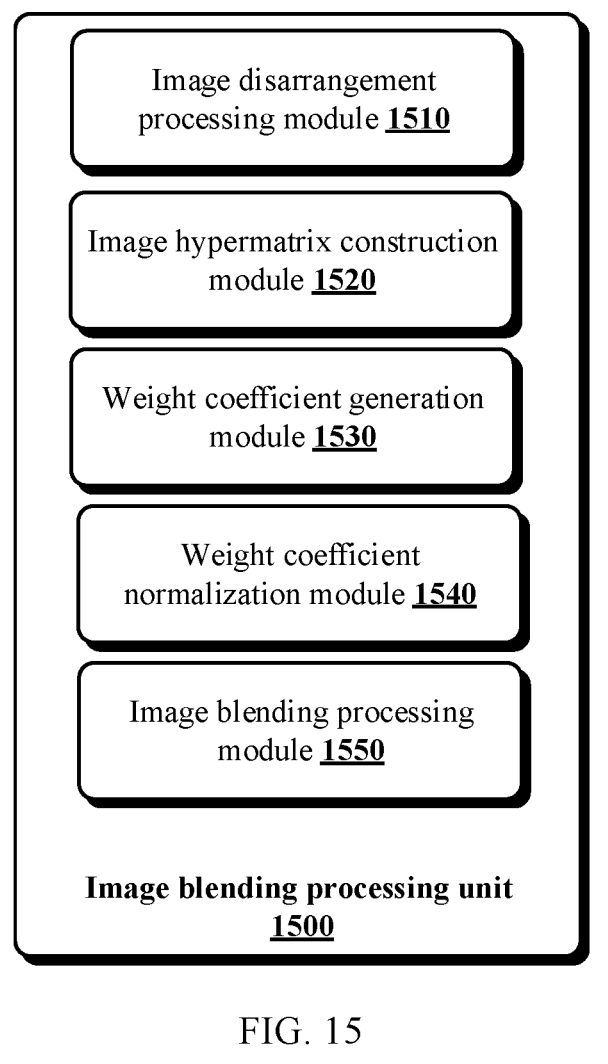

Image disarrangement
processing module 1510

Image hypermatrix construction
module 1520

Weight coefficient generation
module 1530

Weight coefficient
normalization module 1540

Image blending processing
module 1550

**Image blending processing unit
1500**

FIG. 15

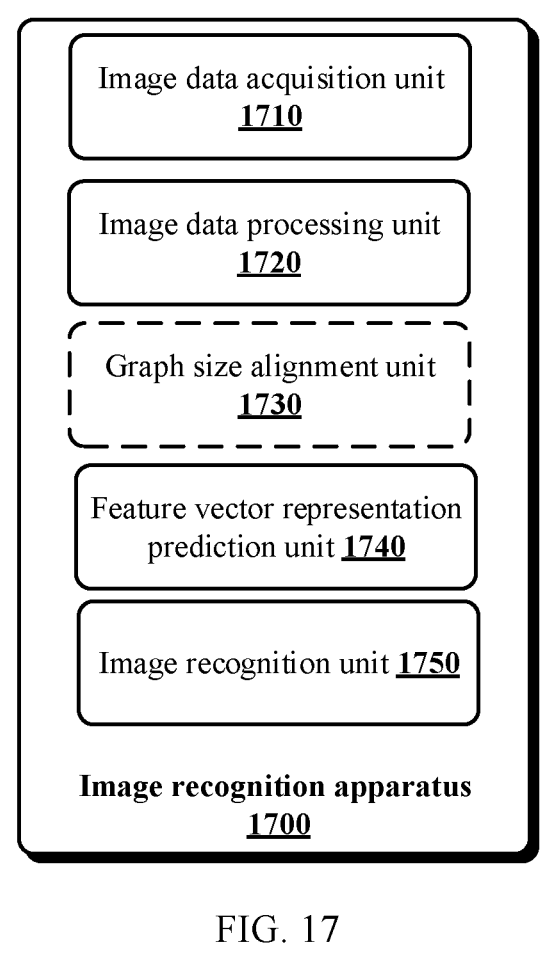

Image data acquisition unit
1710

Image data processing unit
1720

Graph size alignment unit
1730

Feature vector representation
prediction unit 1740

Image recognition unit 1750

**Image recognition apparatus
1700**

FIG. 17

IMAGE DATA PROCESSING METHOD, IMAGE DATA RECOGNITION METHOD, TRAINING METHOD FOR IMAGE RECOGNITION MODEL, IMAGE DATA PROCESSING APPARATUS, TRAINING APPARATUS FOR IMAGE RECOGNITION MODEL, AND IMAGE RECOGNITION APPARATUS

TECHNICAL FIELD

Implementations of the present specification generally relate to the field of artificial intelligence technologies, and in particular, to an image data processing method, a training method for an image recognition model, an image recognition method, an image data processing apparatus, a training apparatus for an image recognition model, and an image recognition apparatus.

BACKGROUND

Service processing solutions based on image data have been widely applied to a large number of applications, for example, a facial recognition-based payment service. In these service processing solutions, original image data is provided as input to a third-party device for processing. Due to unpredictable security level of a running environment of the third-party device, there is a possibility that the original image data or feature vector data obtained through feature extraction on the original image data is maliciously stolen. This poses a great threat to data security or service security (for example, secured payment). As such, before the original image data is provided to the third-party device, image anonymization processing is performed on the original image data by using the provided image anonymization processing solution, to protect data privacy.

SUMMARY

Implementations of the present specification provide an image data processing method, a training method for an image recognition model, an image recognition method, an image data processing apparatus, a training apparatus for an image recognition model, and an image recognition apparatus. According to the image data processing method and apparatus, data anonymization processing is performed on image data based on frequency domain transform to obtain anonymized image data of the image data, and image blending processing is performed on the obtained anonymized image data based on data augmentation, so that data privacy of original image data can be protected.

According to an aspect of the implementations of the present specification, an image data processing method is provided, including: performing data anonymization processing on image data based on frequency domain transform to obtain anonymized image data of the image data, the anonymized image data including a subgraph data set, and each subgraph data in the subgraph data set corresponding to a different frequency; and performing image blending processing on the subgraph data in the obtained anonymized image data based on data augmentation, to obtain augmented anonymized image data.

In some implementations, in an example of the above aspect, the data augmentation can include one or more of: mixup data augmentation or instahide data augmentation.

In some implementations, in an example of the above aspect, the data augmentation includes mixup data augmentation, a number of images used for blending processing is k, and a maximum weight coefficient for blending image is $W_{max}$; and the performing image blending processing on the obtained anonymized image data based on data augmentation can include: performing $k-1$ times of disarrangement processing on the subgraph data set of the anonymized image data to obtain k subgraph data sets; constructing an image hypermatrix with a size of m*k based on the obtained k subgraph data sets, where a first column in the image hypermatrix corresponds to the subgraph data set in an original form, and m is a number of pieces of subgraph data in the subgraph data set in the original form; randomly generating a weight coefficient for each image in the image hypermatrix; performing row normalization on weight coefficients of the images in the image hypermatrix, so that a sum of weight coefficients of each row of images is 1, and a weight coefficient of each image is not greater than $W_{max}$; and performing weighted summation on each row of images of the image hypermatrix to obtain a blended image hypermatrix with a size of m*1, where images in the blended image hypermatrix are augmented anonymized image data.

In some implementations, in an example of the above aspect, $W_{max}$ is 0.55, and k is 3.

In some implementations, in an example of the above aspect, the method can further include: performing graph size alignment processing on each subgraph data in the augmented anonymized image data, so that a size of each subgraph data after the graph size alignment processing is same as a size of the image data in original form.

In some implementations, in an example of the above aspect, the performing anonymization processing on the image data based on frequency domain transform can include: performing local frequency domain transform processing on the image data to obtain at least one feature map, where each feature map of the at least one feature map includes a plurality of elements and corresponds to a data block in the image data, and each element of the plurality of elements corresponds to a frequency in the frequency domain; constructing, by using elements corresponding to frequencies in the at least one feature map, frequency component channel feature maps corresponding to the frequencies, respectively; and obtaining at least one target frequency component channel feature map from the constructed frequency component channel feature maps through screening, to obtain the anonymized image data of the image data, where the target frequency component channel feature map obtained through screening is a key channel feature for image recognition.

In some implementations, in an example of the above aspect, the method can further include: after the obtaining the at least one target frequency component channel feature map from the constructed frequency component channel feature maps through screening, performing a first shuffle processing on the target frequency component channel feature map to obtain a first shuffled feature map; and performing normalization processing on the first shuffled feature map to obtain the anonymized image data of the image data.

In some implementations, in an example of the above aspect, the obtaining the at least one target frequency component channel feature map from the constructed frequency component channel feature maps through screening can include: obtaining the at least one target frequency component channel feature map from the constructed frequency component channel feature maps through screening based on channel importance or a predetermined screening rule.

In some implementations, in an example of the above aspect, the method can further include: after the performing normalization processing on the first shuffled feature map, performing channel blending processing on the first shuffled feature map that has undergone the normalization processing; performing a second shuffle processing on the first shuffled feature map that has undergone the channel blending processing, to obtain a second shuffled feature map; and performing normalization processing on the second shuffled feature map to obtain the anonymized image data of the image data.

In some implementations, in an example of the above aspect, a number of the target frequency component channel feature maps is a feature dimension of first feature data plus one; and the performing channel blending processing on the first shuffled feature map can include: performing channel blending on two adjacent frequency component channel feature maps in the first shuffled feature map.

In some implementations, in an example of the above aspect, the image data includes face image data.

According to an aspect of the implementations of the present specification, an image data processing apparatus is provided, including: a data anonymization processing unit, configured to perform data anonymization processing on image data based on frequency domain transform to obtain anonymized image data of the image data, the anonymized image data including a subgraph data set, and each subgraph data in the subgraph data set corresponding to a different frequency; and an image blending processing unit, configured to perform image blending processing on the subgraph data in the obtained anonymized image data based on data augmentation, to obtain augmented anonymized image data.

According to an aspect of the implementations of the present specification, a training method for an image recognition model is provided. The training method includes: obtaining image data that serves as a training sample and a label of the image data; processing the image data by using the above method, to obtain augmented anonymized image data of the image data, the augmented anonymized image data including a subgraph data set, and each subgraph data having a weight coefficient; performing label blending processing on corresponding labels of subgraph data in each anonymized image data by using weight coefficients of the subgraph data in each the anonymized image data; and training an image recognition model by using the subgraph data in the anonymized image data and the labels of the subgraph data that have undergone the label blending processing.

In some implementations, in an example of the above aspect, when subgraph data in the image blending processing comes from a same category, labels of the subgraph data in the image blending processing remain unchanged, and when at least a part of subgraph data in the image blending processing comes from different categories, non-zero values in labels of the subgraph data are adjusted to k non-zero values, and each non-zero value corresponds to a weight coefficient of a piece of subgraph data.

In some implementations, in an example of the above aspect, the image data includes face image data, and the label or a recognition result indicates identity information corresponding to the face; and the image recognition model is used to predict a feature vector representation of the image data based on the anonymized image data of the image data, and determine the recognition result based on the predicted feature vector representation.

According to an aspect of the implementations of the present specification, a training apparatus for an image recognition model is provided, including: a training data acquisition unit, configured to obtain image data that serves as a training sample and a label of the image data; an image processing unit, configured to process the image data by using the above method, to obtain augmented anonymized image data of the face image data, the augmented anonymized image data including a subgraph data set, and each subgraph data having a weight coefficient; and perform label blending processing on corresponding labels of subgraph data in each anonymized image data by using weight coefficients of the subgraph data in each anonymized image data; and a model training unit, configured to train an image recognition model by using the subgraph data in the anonymized image data and the labels of the subgraph data that have undergone the label blending processing.

According to an aspect of the implementations of the present specification, an image recognition method is provided, including: obtaining image data to be recognized; processing the image data by using the above method, to obtain augmented anonymized image data of the image data; providing the anonymized image data to an image recognition model to predict a feature vector representation of the image data; and determining, based on the predicted feature vector representation and a feature vector representation of a target object, whether the image data to be recognized includes the target object.

In some implementations, in an example of the above aspect, the image data to be recognized includes face image data, and the target object includes face image data with some identity information.

According to an aspect of the implementations of the present specification, an image recognition apparatus is provided, including: an image data acquisition unit, configured to obtain image data to be recognized; an image data processing unit, configured to process the image data by using the above method, to obtain augmented anonymized image data of the image data; a feature vector representation prediction unit, configured to provide the anonymized image data to an image recognition model to predict a feature vector representation of the image data; and an image recognition unit, configured to determine, based on the predicted feature vector representation and a feature vector representation of a target object, whether the image data to be recognized includes the target object.

According to an aspect of the implementations of the present specification, an image processing apparatus is provided, including: at least one processor; a memory coupled to the at least one processor; and a computer program stored in the memory, the at least one processor, individually or collectively, executing the computer program to implement the above image data processing method.

According to another aspect of the implementations of the present specification, a training apparatus for an image recognition model is provided, including: at least one processor; a memory coupled to the at least one processor; and a computer program stored in the memory, the at least one processor executing the computer program to implement the above training method for an image recognition model.

According to an aspect of the implementations of the present specification, an image recognition apparatus is provided, including: at least one processor; a memory coupled to the at least one processor; and a computer program stored in the memory, the at least one processor executing the computer program to implement the above image recognition method.

According to an aspect of the implementations of the present specification, a computer-readable storage medium that stores executable instructions is provided, the instructions being executed to cause a processor to perform the above image data processing method, or perform the above training method for an image recognition model, or perform the above image recognition method.

According to an aspect of the implementations of the present specification, a computer program product that includes a computer program is provided, the computer program being executed by a processor to implement the above image data processing method, or implement the above training method for an image recognition model, or implement the above image recognition method.

BRIEF DESCRIPTION OF DRAWINGS

The essence and advantages of the content of the present specification can be further understood with reference to the following accompanying drawings. In the accompanying drawings, similar components or features can have the same reference numeral.

FIG. 3 is a flowchart illustrating an example of a data anonymization processing procedure based on frequency domain transform according to an implementation of the present specification;

FIG. 7 is a flowchart illustrating another example of a data anonymization processing procedure based on frequency domain transform according to an implementation of the present specification;

FIG. 8 is a flowchart illustrating an example of an image blending processing procedure based on mixup data augmentation according to an implementation of the present specification;

FIG. 11 is a flowchart illustrating an example of an image recognition method according to an implementation of the present specification;

FIG. 12 is a block diagram illustrating an example of an image data processing apparatus according to an implementation of the present specification;

FIG. 13 is a block diagram illustrating an example of a data anonymization processing unit according to an implementation of the present specification;

FIG. 14 is a block diagram illustrating an example of a data anonymization processing unit according to another implementation of the present specification;

FIG. 15 is a block diagram illustrating an example of an image blending processing unit according to an implementation of the present specification;

FIG. 17 is a block diagram illustrating an example of an image recognition apparatus according to an implementation of the present specification;

DESCRIPTION OF IMPLEMENTATIONS

Figure 1:
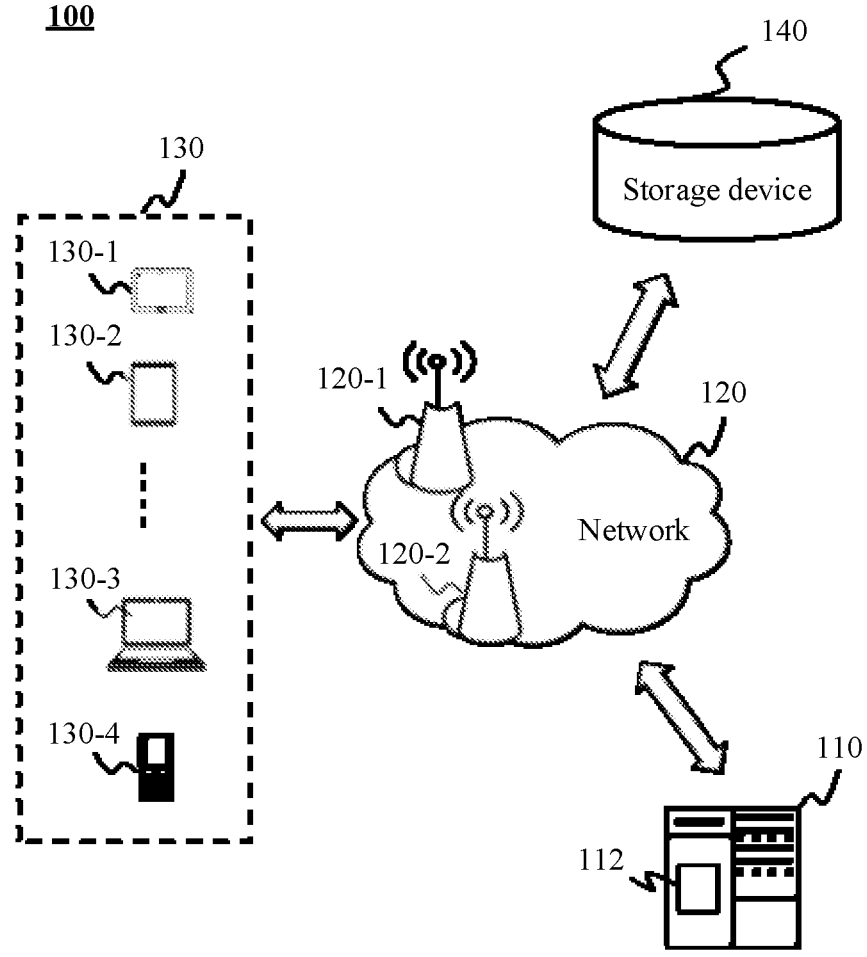
FIG. 1 is a schematic diagram illustrating an example of an application scenario of an image data processing system according to an implementation of the present specification.

The subject matter described herein will now be discussed with reference to example implementations. It should be understood that these implementations are merely discussed to enable a person skilled in the art to better understand and implement the subject matter described in the present specification, and are not intended to limit the protection scope, applicability, or examples described in the claims. The functions and arrangements of the discussed elements can be changed without departing from the protection scope of the content of the present specification. Various processes or components can be omitted, replaced, or added in the examples based on needs. For example, the described method can be performed in a different order from the described order, and various steps can be added, omitted, or combined. In addition, features described with respect to some examples can alternatively be combined in other examples.

As used in the present specification, the term "include" and its variant represent open terms, and mean "including but not limited to". The term "based on" means "at least partially based on". The terms "an implementation" and "an implementation" represent "at least an implementation". The term "another implementation" represents "at least one another implementation". The terms "first", "second", and the like can represent different or same objects. Other explicit or implicit definitions can be included below. Unless the context clearly indicates otherwise, the definition of a term is consistent throughout the specification. The term "predetermined" refers to that a value, a parameter, or a threshold is determined before the value, parameter or threshold is used in a process or an operation, and a predetermined value, parameter, or threshold can be dynamically determined or adjusted, and can be determined automatically by a machine with or without human inputs. The term "predetermined" does not mean or limit that a value, a parameter, or a threshold is fixed or is input by a user for a process or an operation.

With the development of computer technologies, image recognition is increasingly penetrating into various fields of people's lives. For example, facial recognition technologies have been widely applied to various scenarios, such as facial recognition-based intelligent unlocking, facial recognition-based terminal application login, and facial recognition-based payment. However, a face image may include some sensitive information or personal privacy information. To avoid unnecessary losses caused by leakage of the information, it is necessary to perform anonymization processing on the face image.

Considering that the face image is an important basis for identity recognition, an implementation of the facial recognition technology is to input the face image into a facial recognition model for processing, and perform identity verification based on a processing result (for example, face feature data) of the facial recognition model. However, due to uncontrollable data security concerns of a third-party device (or a running environment of the third-party device), there is a possibility that original face image data or face feature data obtained after the original face image data is processed by using the facial recognition model is maliciously stolen. Unlawful individuals may restore the original face image data in a manner such as reconstruction based on the stolen face feature data, and then illegally obtain operation permission of a person corresponding to the face data based on the original face image data, for example, unlocking or fraudulent card use. This poses a great threat to secure payment, unlocking, and the like. With the increasing emphasis on personal privacy protection, how to protect privacy of a face image used for facial recognition becomes a problem to be urgently resolved.

Implementations of the present specification provide an image processing method, a training method for an image recognition model, an image recognition method, an image processing apparatus, a training apparatus for an image recognition model, and an image recognition apparatus, to more securely and effectively protect data privacy of image data by performing anonymization processing on the image data.

The examples described herein are merely for illustrative purposes, and should not be construed as a limitation on this solution. Although the present specification is mainly described by using a face image as an example, it should be understood that the technical solutions disclosed in the present specification can be applied to any type of image data to enhance data security and protection, for example, fingerprint image data. The technical solutions disclosed in the present specification are described below with reference to the accompanying drawings.

The image processing method, the training method for an image recognition model, the image recognition method, the image processing apparatus, the training apparatus for an image recognition model, and the image recognition apparatus according to the implementations of the present specification are described below with reference to the accompanying drawings.

FIG. 1 is a schematic diagram illustrating an example of an application scenario of an image data processing system 100 according to an implementation of the present specification.

As shown in FIG. 1, in the application scenario, the image data processing system 100 can include a server 110, a network 120, a terminal device 130, and a storage device 140.

The image data processing system 100 can be widely applied to various image recognition scenarios, such as facial recognition-based unlocking, facial recognition-based payment, and unlocking-based terminal application login. In some implementations, the system can also be applied to any other scenario where image privacy protection is to be performed, such as transmission and storage of sensitive image data. After the image data is processed by implementing the method disclosed in the present specification, subsequent image data processing tasks (for example, image recognition tasks) can be normally completed based on the processed image data, and it is difficult to reconstruct original image data based on the processed image data, thereby effectively protecting privacy information of the image from being leaked.

In an example application scenario, the terminal device 130 can collect a face image to be recognized by using an image collection device (for example, a camera). The terminal device 130 can perform anonymization processing on the collected face image by implementing the image processing method provided in the present specification, to obtain anonymized image data, and then send the anonymized image data to the server 110 by using the network 120. The server 110 can be configured to process information and/or data related to a data service request and/or image processing and image recognition. For example, in response to a data service request from the terminal device 130, the server 110 can receive the anonymized image data sent by the terminal device 130, and feed back a recognition result to the terminal device 130 or provide a corresponding data service to the terminal device 130 after completing recognition of the anonymized image data (for example, when determining that the anonymized image data is from a lawful face image). In some implementations, the server 110 can process the face image by using a pre-trained image recognition model, and obtain a predicted feature vector representation of the face image. After obtaining the predicted feature vector representation of the face image, the server 110 can further perform a subsequent operation, for example, compare the predicted feature vector representation with a feature vector representation of a face image successfully registered with and stored in the system, and feed back a comparison result (for example, an identity recognition result) to the terminal device 130, so as to complete facial recognition-based payment, facial recognition-based unlocking, and the like.

In some implementations, the server 110 cam be a local server or a remote server. For example, the server 110 can be integrated to or locally connect to the terminal device 130 to obtain information and/or data sent by the terminal device 130. For another example, the server 110 can remotely receive, by using the network 120, information and/or data sent by the terminal device 130. In some implementations, the server 110 can be implemented on a cloud platform. By way of example only, the cloud platform can include a private cloud, a public cloud, a hybrid cloud, a community cloud, a distributed cloud, an internal cloud, a multi-layer cloud, or any combination thereof.

The network 120 can facilitate exchange of information and/or data. In some implementations, one or more components (for example, the server 110, the terminal device 130, and the storage device 140) of the image data processing system 100 can transmit information to other components of the image data processing system 100 by using the network 120. For example, the terminal device 130 can send the anonymized image data of the image to be recognized to the server 120 by using the network 120. For an example, the server 110 can send, to the storage device 140 for storage, the predicted feature vector representation obtained by processing the anonymized image data of the image to be recognized, and return a comparison result of the predicted feature vector representation and a feature vector representation of a target object to the terminal device 130. In some implementations, the network 120 can be any form of wired or wireless network, or any combination thereof. By way of example only, the network 120 can be one or a combination of a wired network, a fiber optic network, a telecommunication network, an intranet, the Internet, a local area network (LAN), a wide area network (WAN), a wireless local area network (WLAN), a metropolitan area network (MAN), a wide area network (WAN), a public switched telephone network (PSTN), a Bluetooth network, or the like.

The terminal device 130 can be configured to process information and/or data associated with image processing and image recognition, to perform one or more functions disclosed in the present specification. In some implementations, the terminal device 130 can be a common device that provides an image collection service and/or a data processing service to the public, for example, an Internet of Things (IoT) device 130-1. For example, the IoT device 130-1 can include but is not limited to a facial recognition-based vending machine, a facial recognition-based payment device, a personal banking device, or any combination thereof. After completing facial recognition on the terminal device 130, the user can use a data service provided by the device. In some implementations, the terminal device 130 can be configured to obtain image data to be processed that is collected because the image collection apparatus of the device is triggered. In some implementations, the terminal device 130 can perform image data processing on the image data to be processed, to obtain anonymized image data of the image data to be processed. In some implementations, a trusted execution environment can be deployed on the terminal device 130, and image collection and image processing are performed in the trusted execution environment. In some implementations, the terminal device 130 can include one or more processing engines (for example, a single-core processing engine or a multi-core processor). By way of example only, the processing engine can include one or a combination of a central processing unit, an application-specific integrated circuit (ASIC), an application-specific instruction set processor (ASIP), a graphics processing unit (GPU), a physics processing unit (PPU), a digital signal processor (DSP), a field programmable gate array (FPGA), a programmable logic device (PLD), a controller, a micro control unit, a reduced instruction set computer (RISC), a microprocessor, and the like.

In some implementations, the terminal device 130 can further be a portable device with a data acquisition, storage, and/or sending function, such as a tablet computer, a notebook computer, a smartphone, a camera, or any combination thereof. In some implementations, the terminal device 130 can exchange data with the server 110 by using a network. For example, the terminal device 130 can transmit, to the server 110, the anonymized image data obtained after the image data to be processed is processed. In some implementations, the data obtained by the terminal device 130 can be face image data collected by the camera of the device. The server 110 can receive the face image data from the terminal device 130, and perform anonymization processing and subsequent recognition on the image data. In this case, the server 110 can be integrated with the terminal device 130.

The storage device 140 can store data and/or instructions related to image processing, for example, store a feature vector of an image, image data, and identity information of a user who has successfully registered with the system. In some implementations, the storage device 140 can store data obtained/acquired by the terminal device 130 and/or the server 110. In some implementations, the storage device 140 can store data and/or instructions used by the server 110 to perform or implement the example method described in the present application. In some implementations, the storage device 140 can include a mass memory, a removable memory, a volatile read-write memory, a read-only memory (ROM), or any combination thereof. For example, the mass memory can include a disk, an optical disc, a solid-state disk, and the like. For example, the removable memory can include a flash drive, a floppy disk, an optical disc, a memory card, a compact disc, a magnetic tape, and the like. For example, the volatile read-only memory can include a random access memory (RAM). For example, the RAM can include a dynamic RAM (DRAM), a double rate synchronous dynamic RAM (DDRSDRAM), a static RAM (SRAM), a thyristor RAM (T-RAM), a zero-capacitor RAM (Z-RAM), and the like. For example, the ROM can include a mask ROM (MROM), a programmable ROM (PROM), an erasable programmable ROM (EPROM), an electrically erasable programmable ROM (EEPROM), a compact disc ROM (CD-ROM), a digital versatile disc ROM, and the like. In some implementations, the storage device 140 can be implemented on a cloud platform. By way of example only, the cloud platform can include a private cloud, a public cloud, a hybrid cloud, a community cloud, a distributed cloud, an internal cloud, a multi-layer cloud, or any combination thereof.

In some implementations, the storage device 140 can be connected to the network 120 to communicate with one or more components (for example, the server 110 and the user terminal 130) in the image data processing system 100. One or more components in the image data processing system 100 can access, by using the network 120, data or instructions stored in the storage device 140. In some implementations, the storage device 140 can be directly connected to or communicate with one or more components (for example, the server 110 and the user terminal 130) in the image data processing system 100. In some implementations, the storage device 140 can be a part of the server 110.

Figure 2:
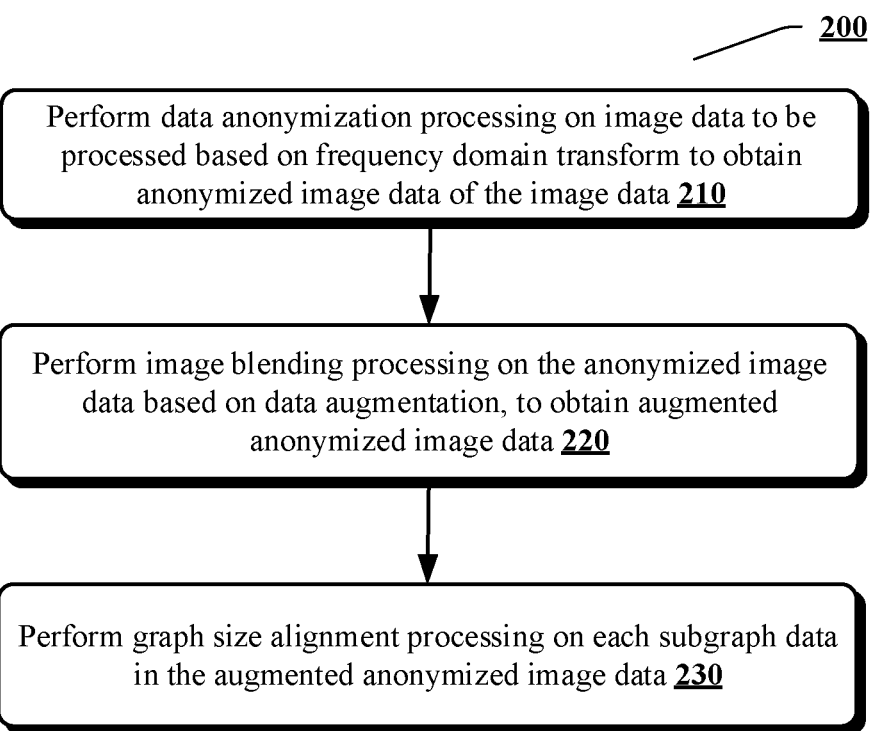
FIG. 2 is a flowchart illustrating an example of an image data processing method according to an implementation of the present specification.

FIG. 2 is a flowchart illustrating an example of an image data processing method 200 according to an implementation of the present specification. In some implementations, the image data processing method 200 can be performed by a processing device, for example, performed by a terminal device 130 or a server 110. For example, the image data processing method 200 can be stored in a storage apparatus (such as a built-in storage unit or an external storage device of a processing device) in a form of a program or instructions. When being executed, the program or the instructions can implement the image data processing method 200.

As shown in FIG. 2, at step 210, data anonymization processing is performed on image data to be processed based on frequency domain transform to obtain anonymized image data of the image data. The obtained anonymized image data includes a subgraph data set, and each subgraph data in the subgraph data set corresponds to a different frequency.

In the present specification, the term "subgraph data" can refer to a plurality of subgraphs extracted from the image data to be processed by using an image processing method, and a subgraph carries some features of the image data to be processed. In some cases, the term "subgraph data" can be used interchangeably with the term "feature map" in the present specification.

FIG. 3 is a flowchart illustrating an example of a data anonymization processing procedure 300 based on frequency domain transform according to an implementation of the present specification.

As shown in FIG. 3, at step 310, local frequency domain transform processing is performed on the image data to be processed to obtain at least one feature map, where each feature map of the at least one feature map includes a plurality of elements and corresponds to a data block in the image data, and each element of the plurality of elements corresponds to a frequency in the frequency domain.

The image data to be processed is image data that is to be processed under the current anonymization processing. For example, the image data to be processed can be original face image data, or can be image data obtained after face detection or face alignment has been performed on the original face image data. The original face image data can be image data that is directly collected by an image collection device (for example, a camera) and that has not undergone any processing. Face detection means detecting a location of a face in an image, and the image data to be processed can be an image that is cropped based on the location of the face in the image, for example, cropping an unnecessary part other than the face in the image. Face alignment means correcting an angle of a face in an image. A face in the original face image may be tilted at an angle, and face alignment can be performed to correct the face in the image, to facilitate subsequent image recognition processing.

In some implementations, the processing device can obtain the image data to be processed by using a camera of the terminal device, or can obtain the image data to be processed in a manner such as reading from a database or a storage device, or invoking a data interface.

It should be noted that a program/code for obtaining the image data to be processed can run in a trusted execution environment deployed in the processing device, and a security feature of the trusted execution environment can be used to ensure that image data obtained by the processing device is not stolen. In addition, the method and/or the process disclosed in the implementations of the present specification can also be executed in the trusted execution environment, to ensure that an entire process from an image data acquisition source to image data processing is secure and credible, thereby improving security of privacy protection of the image data to be processed.

After the image data to be processed is obtained, local frequency domain transform can be performed on the obtained image data to be processed to obtain at least one feature map. The feature map refers to a plurality of subgraphs extracted from the image data to be processed by using an image processing method, and each subgraph carries some features of the image data to be processed. A size of the obtained feature map can be the same as a size of the image data to be processed. For example, pixels are in a one-to-one correspondence. Alternatively or additionally, a size of the obtained feature map can be different from a size of the image data to be processed.

In some implementations, examples of local frequency domain transform processing can include, but are not limited to, local discrete cosine transform, local wavelet transform, or local discrete Fourier transform.

Figure 4:
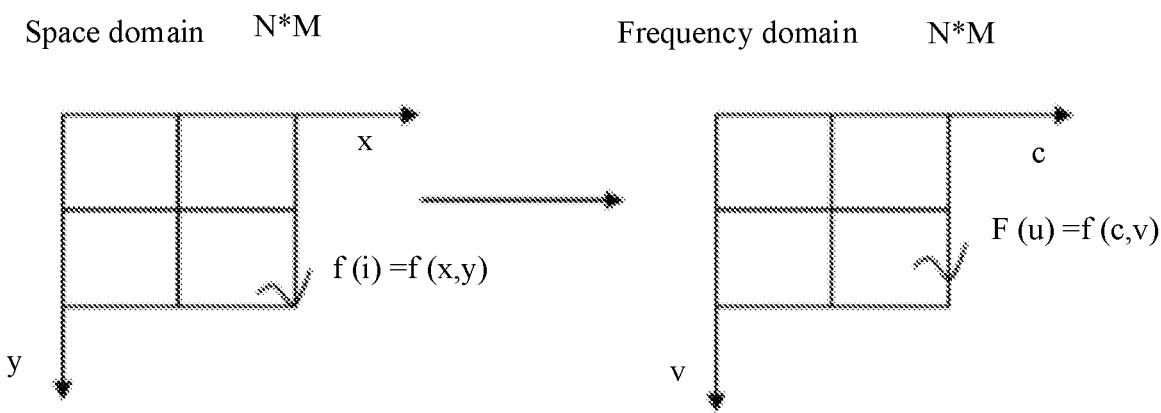
FIG. 4 is a schematic diagram illustrating an example of transforming image feature data from the space domain to the frequency domain according to an implementation of the present specification.

FIG. 4 is a schematic diagram illustrating an example of transforming voice feature data from the space domain to the frequency domain according to an implementation of the present specification. In FIG. 4, the space domain is represented by using a coordinate system (x, y), the frequency domain is represented by using a coordinate system (c, v), and N*M represents a size of an image, for example, 2*2 in FIG. 4. A number of feature points can be consistent after transform from the space domain to the frequency domain. One square block in the space domain represents one pixel location, and one square block in the frequency domain represents one frequency location.

In some implementations, the following discrete cosine transform equation (1) can be used to perform discrete cosine transform on grayscale image data to be transformed:

$$F(u, v) =$$ $$\hspace{4cm} (1)$$

$$\frac{1}{4}c(u)c(v)\sum_{x=0}^{N-1}\sum_{y=0}^{M-1} f(x, y) \cos\left[\frac{(x+0.5)\pi}{N}u\right] \cos\left[\frac{(y+0.5)\pi}{N}v\right],$$

where F(u, v) is a value of a transformed feature point (e.g., each frequency location) in the frequency domain, f(x, y) is a pixel value in the image data to be transformed (grayscale image data), (u, v) are coordinates of the transformed feature point in the frequency domain, (x, y) is coordinates of the image data to be transformed in the space domain, N is a number of rows of pixels or feature points of the image data to be transformed, and M is a number of columns of pixels or feature points of the image data to be transformed, for example, when a size of the image data to be processed is 8*8, N=M=8.

c(u) can be represented by using the following equation (2):

$$c(u) = \begin{cases} \sqrt{\dfrac{1}{\sqrt{2}}}, & \text{if } u = 0 \\ 1, & u \neq 0 \end{cases} \hspace{1cm} (2)$$

where c(u)=c(v).

Local frequency domain transform processing can be performed on the image data to obtain a plurality of transform results, e.g., a plurality of feature maps. During local frequency domain transform processing, an image block (e.g., a local image block) with a size smaller than the size of the image data to be transformed can be selected. For example, the size of the image data to be transformed is 256×256, and the size of the selected image block is 8×8. Then, the size of the selected image block is used to perform moving sampling on the image data to be transformed by using a step length or sampling interval (for example, 8), and discrete cosine transform is performed, based on equation (1) and equation (2), on local data (e.g., a data block with a size of 8×8) that is of the image data to be transformed and that is obtained in each time of sampling, to obtain a plurality of transform results. A size of each transform result can be 8×8. During discrete cosine transform, a smaller moving step of the image block indicates a larger number of features included in the obtained transform result. This can help improve accuracy of subsequent image data processing.

Figure 5:
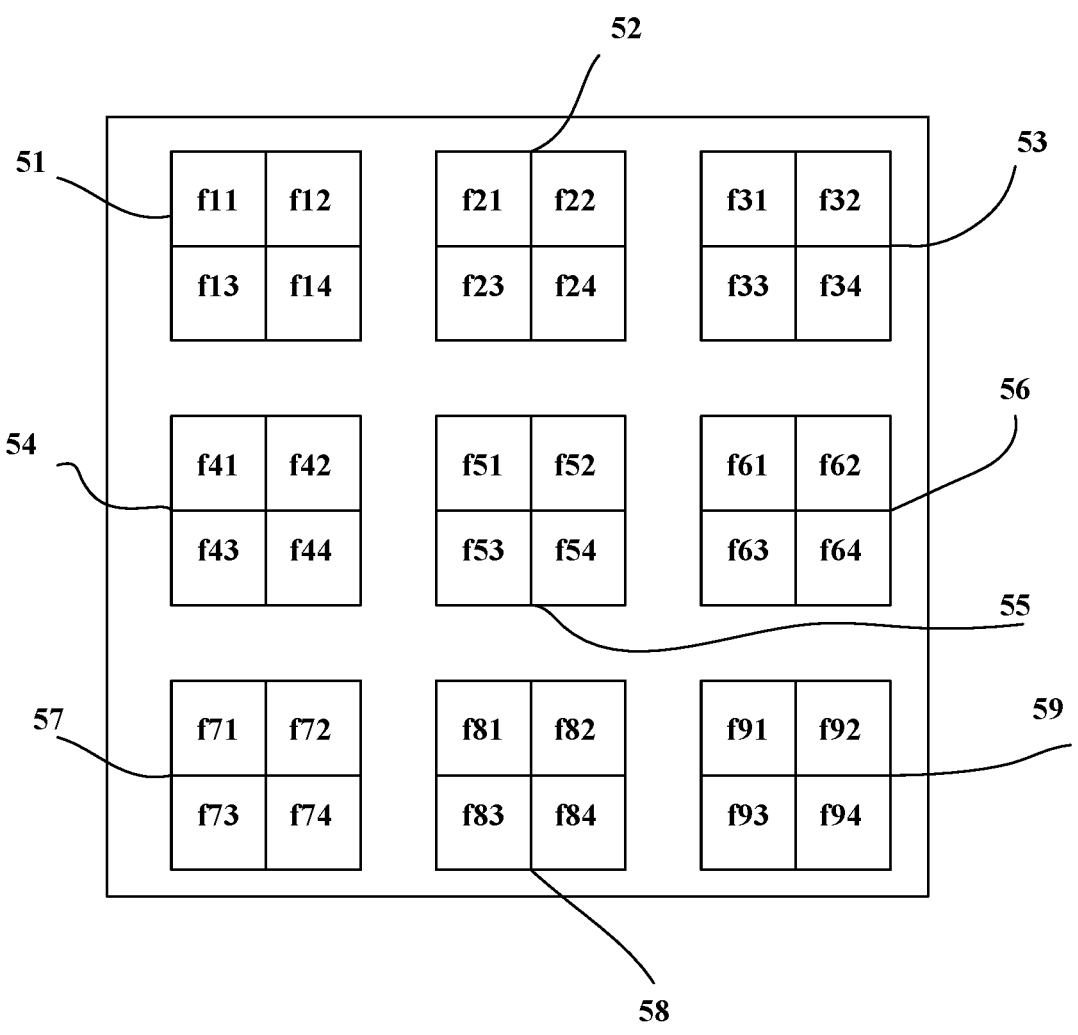
FIG. 5 is a schematic diagram illustrating an example of a local frequency domain transform process according to an implementation of the present specification.

FIG. 5 is a schematic diagram illustrating an example of a local frequency domain transform process according to an implementation of the present specification. In the example of FIG. 5, the size of image data to be transformed is 6×6, the size of the selected local image block is 2×2, moving sampling is performed on the image data to be transformed by using a step of 2, and frequency domain transform is performed on a sampled local image block, for example, discrete cosine transform. As such, nine transform results are obtained, e.g., nine feature maps 51, 52, 53, 54, 55, 56, 57, 58, and 59. Values of frequency locations in each transform result are respectively represented by using fi1, fi2, fi3, and fi4, where i represents an $i^{th}$ transform result, and fij represents a value of a $j^{th}$ frequency location in the $i^{th}$ transform result. It can be seen from the figure that each transform result has four corresponding frequency locations.

At step 320, frequency component channel feature maps corresponding to the frequencies are constructed by using elements corresponding to frequencies in the at least one feature map, respectively. For example, elements (values) at a same frequency location in all transform results are combined to obtain one frequency component channel feature map, so as to obtain a plurality of frequency component channel feature maps of different frequency locations in corresponding transform results. It is not difficult to understand that a number of frequency component channel feature maps is consistent with a number of pixels of an image block used for sampling in a transform process.

Figure 6:
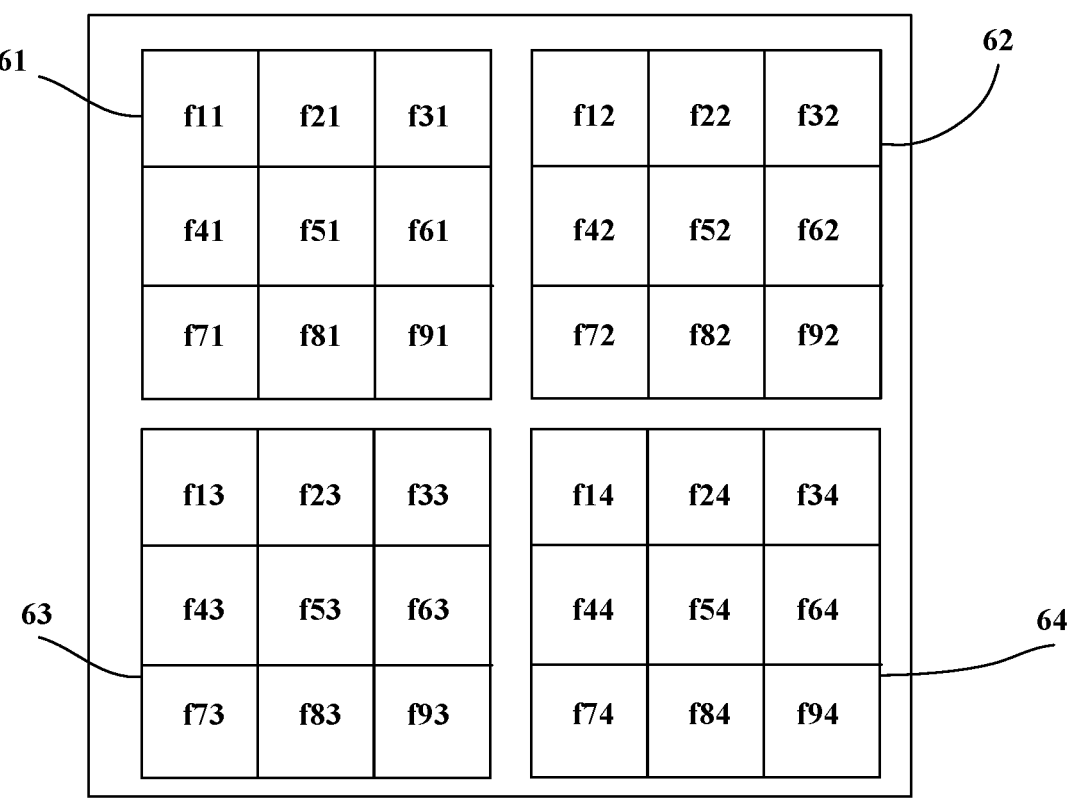
FIG. 6 is a schematic diagram illustrating an example of a frequency component channel feature map according to an implementation of the present specification.

FIG. 6 is a schematic diagram illustrating an example of a frequency component channel feature map according to an implementation of the present specification. The frequency component channel feature map shown in FIG. 6 is a frequency component channel feature map corresponding to the transform result in FIG. 5.

As shown in FIG. 6, based on the transform result in FIG. 5, four frequency component channel feature maps, e.g., the number of pixels of the image block used for sampling is 4, can be obtained, and each frequency component channel feature map includes nine elements. Frequency component channel feature map 61 corresponds to first frequency location fi1, frequency component channel feature map 62 corresponds to second frequency location fi2, frequency component channel feature map 63 corresponds to third frequency location fi3, and frequency component channel feature map 64 corresponds to fourth frequency location fi4.

After the frequency component channel feature maps are constructed above, at step 330, at least one target frequency component channel feature map is obtained from the constructed frequency component channel feature maps through screening. The target frequency component channel feature map obtained through screening is a key channel feature for image recognition.

In some implementations, the at least one target frequency component channel feature map can be obtained from the constructed frequency component channel feature maps through screening based on channel importance or a predetermined screening rule.

In some implementations, the processing device can input the plurality of transform results into a trained SEnet network, so that the SEnet network provides channel importance, for example, a score that is positively correlated with the importance, of each feature map. Herein, channel importance refers to relative importance of a channel in image recognition. The SEnet network can be trained together, e.g., as a whole, with an image recognition model. For example, the SEnet network is added to the image recognition model, and a parameter of the SEnet network is adjusted in a training process of the image recognition model, to obtain the SEnet network used to determine channel importance of a feature map.

In some implementations, the predetermined screening rule can be selecting and retaining a predetermined proportion of feature maps that include a large amount of feature information. For example, in the plurality of feature maps obtained through discrete cosine transform and recombination, a predetermined proportion of low-frequency feature maps can be retained, and some high-frequency feature maps can be discarded. For example, low-frequency feature maps of a proportion of 50%, 60%, and 70% can be retained, and remaining high-frequency feature maps can be discarded. For example, low-frequency feature maps 61, 62, and 63 shown in FIG. 6 are retained, and high-frequency feature map 64 is discarded. In a transform result obtained after discrete cosine transform, a value of a frequency location at the upper left corresponds to a low frequency component, and a value of a frequency location at the lower right corresponds to a high frequency. For example, in transform result 51 in FIG. 5, f11 corresponds to low frequency data, and f14 corresponds to high frequency data. Referring to the above equation (1), when (u, v) is (0,0), $$\cos\left[\frac{(x+0.5)\pi}{N}u\right]\cos\left[\frac{(y+0.5)\pi}{N}v\right]=1,$$

F(0,0) does not include an alternating current component, and can be considered as a direct current. Therefore, a value in the upper left corner of a transform result corresponds to a lowest frequency. As a coordinate location moves to the lower right corner, F(u, v) includes an alternating current component, and a frequency increases. Therefore, a value in the lower right corner of the transform result corresponds to a highest frequency.

In the example of FIG. 3, the at least one target frequency component channel feature map obtained through screening is used as the anonymized image data of the image data to be processed. As such, the anonymized image data is image data obtained after anonymization processing is performed on the plurality of feature maps, and can include one or more frequency component channel feature maps obtained after anonymization processing. The anonymized image data is different from the image data to be processed. Because the anonymized image data is a feature map, original face information of the image data cannot be directly obtained from the anonymized image data.

In the example of FIG. 3, the anonymization processing includes reconstructing the frequency component channel feature map and feature map screening for the frequency component channel feature map. In some implementations, in addition to the above operations, the anonymization processing method can further include shuffle processing, normalization processing, channel blending processing, or any combination thereof.

FIG. 7 is a flowchart illustrating another example of a data anonymization processing procedure 700 based on frequency domain transform according to an implementation of the present specification. The implementation shown in FIG. 7 is a modified implementation for the implementation shown in FIG. 3. Step 710 to step 730 in FIG. 7 are totally the same as step 210 to step 230 in FIG. 2. For simplicity of description, content of the same part is not described below, but only differences are described.

As shown in FIG. 7, after the target frequency component channel feature map is obtained through screening in step 730, the target frequency component channel feature map obtained through screening is not used as the anonymized image data, but operations of step 740 to step 760 are further performed, to obtain more secure anonymized image data.

For example, after the at least one target frequency component channel feature map is obtained through screening from the constructed frequency component channel feature maps, at step 740, a first shuffle processing is performed on the target frequency component channel feature map obtained through screening, to obtain a first shuffled feature map. In addition, normalization processing is performed on the first shuffled feature map. In some implementations, data obtained after normalization processing is performed on the first shuffled feature map can be directly used as the anonymized image data. In some implementations, subsequent processing is performed on data obtained after normalization processing is performed on the first shuffled feature map, to obtain the anonymized image data.

In some implementations, the first shuffle processing can be randomizing the target frequency component channel feature map obtained through screening. Randomization is randomizing an arrangement order of the plurality of feature maps. For example, the plurality of target frequency component channel feature maps obtained through screening are 61, 62, and 63 in FIG. 6, and an arrangement order obtained after randomization can be 63, 61, and 62.

In some implementations, a normalization parameter is a parameter used when normalization processing is performed on the plurality of target frequency component channel feature maps. During normalization processing, a normalization coefficient of each frequency component channel feature map can be determined based on the frequency component channel feature map, so that the normalization parameter used when normalization processing is performed on each frequency component channel feature map is only related to the frequency component channel feature map itself, but not related to another frequency component feature map. As such, difficulty of reconstructing voice data can be increased. For example, it is assumed that a frequency component channel feature map is reconstructed. However, because parameters used when all the frequency component channel feature maps are normalized are different, another frequency component channel feature map cannot be reconstructed by using a normalization parameter of the reconstructed frequency component channel feature map. The above normalization processing can also be referred to as self-normalization processing.

In some implementations, the normalization parameter can be an average or a variance of all values of the frequency component channel feature map, or can be a maximum value or a minimum value of all values of the frequency component channel feature map. Normalization processing allows to divide a value of each element in the frequency component channel feature map by using the normalization parameter, and replace an original value with a quotient obtained through division, to obtain a frequency component channel feature map that has undergone the normalization processing.

The above first shuffle processing and corresponding normalization processing are performed, so that it is difficult to obtain the original data of the target frequency component channel feature map obtained through screening, thereby protecting data privacy and security of the target frequency component channel feature map obtained through screening.

At step 750, channel blending processing is performed on the first shuffled feature map that has undergone normalization.

Blending processing can be performed on two or more feature maps in the plurality of frequency component channel feature maps in a predetermined calculation manner. For example, calculation can be performed by using values of corresponding elements in two or more frequency component channel feature maps, and a calculated value can be used as a value of a corresponding element in a frequency component channel feature map obtained after blending. As such, two or more frequency component channel feature maps can be blended into one frequency component channel feature map. The predetermined calculation manner can be calculating an average value, a sum, a difference, and the like.

In some implementations, channel blending can be blending two adjacent frequency component channel feature maps. It should be noted that, when feature maps are combined, combination patterns of different frequency component channel feature maps may be the same. For example, starting from the first frequency component channel feature map, a current frequency component channel feature map is combined with a next frequency component channel feature map adjacent to the current frequency component channel feature map, e.g., the first frequency component channel feature map is combined with the second frequency component channel feature map, and the second frequency component channel feature map is combined with the third frequency component channel feature map. As such, for M frequency component channel feature maps, M−1 frequency component channel feature maps can be obtained, thereby achieving dimension reduction.

In some implementations, when two adjacent frequency component channel feature maps are blended, a number of the target frequency component channel feature maps obtained through screening can be set to a feature dimension of first feature data plus one. In this processing manner, a feature dimension of the obtained anonymized image data can be the same as the feature dimension of the first feature data, so that a model architecture of a voice intention understanding model does not need to be modified.

After channel blending, a value of each element in the frequency component channel feature map obtained after channel blending changes relative to a value of the frequency component channel feature map existing before channel blending. This can damage a relative relationship between values of elements in an original frequency component channel feature map, and can further increase difficulty of reconstructing original voice data or voiceprint information based on the frequency component channel feature map.

After the channel blending is performed, at step 760, a second shuffle processing is performed on the first shuffled feature map that has undergone the channel blending processing, to obtain a second shuffled feature map. In addition, normalization processing is performed on the second shuffled feature map. For the second shuffle processing and normalization processing, references can be made to the descriptions of step 750. Details are omitted herein for simplicity. In some implementations, data obtained after normalization processing is performed on the second shuffled feature map can be directly used as the anonymized image data. In some implementations, subsequent processing is performed on data obtained after normalization processing is performed on the second shuffled feature map, to obtain the anonymized image data.

It should be noted that in the examples of FIG. 3 and FIG. 7, "subgraph data" is a frequency component channel feature map.

The above second shuffle processing and corresponding normalization processing are performed, so that it is difficult to obtain original data of the frequency component channel feature map obtained after channel blending, thereby protecting data privacy and security of the frequency component channel feature map obtained after channel blending. It should be noted that in some implementations, the first shuffle processing can be pseudo random shuffle processing, and the second shuffle processing can be fully random shuffle processing.

In the data anonymization processing procedure shown in FIG. 7, because two times of shuffle and normalization processing are performed, difficulty of brute-force attack can be greatly increased. For example, local cosine transform is performed on the first feature data based on a local image block of 8*8, so that 64 frequency component channel feature maps can be constructed. In addition, after shuffle processing is performed on the frequency component channel feature maps, arrangement of each small block frequency component (one frequency component channel feature map corresponds to one frequency component) in a transform result is random. In this case, a size of randomized brute-force attack space is 64!, where "!" represents a factorial operation. Even if channel screening is performed on the frequency component channel feature maps by using channel importance to determine, for example, 36 main feature maps, the brute-force attack space is still 36!. However, in the anonymization process, two times of randomization processes are used, so that the size of the brute-force attack space is 36!*36!. A value of the size is greater than key cracking space of a 256-bit Advanced Encryption Standard (AES) encryption algorithm. This makes it difficult to reconstruct the original voice data through brute-force attack. In addition, the normalization parameter depends only on a corresponding frequency component channel feature map, and normalization parameters of different frequency component channel feature maps are different. As such, it is more difficult to infer a normalization parameter of each frequency component channel feature map. In addition, channel blending processing is further performed on the frequency component channel feature maps, and only a result obtained after channel blending is retained. This damages a relative relationship between values of the frequency component channel feature map, thereby further improving difficulty of data cracking, and improving privacy protection of voice data.

Back to FIG. 2, after the anonymized image data of the image data to be processed is obtained, at step 220, image blending processing is performed on the subgraph data in the obtained anonymized image data based on data augmentation, to obtain augmented anonymized image data. In some implementations, examples of data augmentation can include, but are not limited to, mixup data augmentation, instahide data augmentation, and the like.

Mixup data augmentation usually has two hyperparameters. One hyperparameter is a maximum weight coefficient $W_{max}$ for blending image (a sum of all weight coefficients of the blended images is 1). Generally, the maximum weight coefficient $W_{max}$ is 0.65 by default. Preferably, the maximum weight coefficient $W_{max}$ can be set to 0.55, so that different images can contribute more data to blending, thereby improving a privacy protection capability. The other hyperparameter is a number k of images in a blending operation. A larger k indicates more information for blending, a higher privacy protection capability, and a lower recognition rate. In some implementations, k is 3.

FIG. 8 is a flowchart illustrating an example of an image blending processing procedure 800 based on mixup data augmentation according to an implementation of the present specification.

As shown in FIG. 8, at step 810, k−1 times of disarrangement are performed on the subgraph data set of the obtained anonymized image data to obtain k subgraph data sets;

At step 820, an image hypermatrix with a size of m*k is constructed based on the obtained k subgraph data sets. The first column in the constructed image hypermatrix corresponds to an original subgraph data set, the remaining columns each correspond to a subgraph data set obtained after each time of disarrangement, and m is a number of pieces of subgraph data in the original subgraph data set.

At step 830, a weight coefficient is randomly generated for each image in the image hypermatrix.

At step 840, row normalization is performed on the weight coefficients of the images in the image hypermatrix, so that a sum of weight coefficients of each row of images is 1, and a weight coefficient of each image is not greater than $W_{max}$. That is, after normalization, a maximum weight coefficient of each row of images should not exceed $W_{max}$, for example, should not exceed 0.55.

At step 850, weighted summation is performed on each row of images of the image hypermatrix to obtain a blended image hypermatrix with a size of m*1, where an image in the obtained blended image hypermatrix is augmented anonymized image data.

In some implementations, after the augmented anonymized image data is obtained, at step 230, graph size alignment processing is performed on each subgraph data in the augmented anonymized image data, so that a size of each subgraph data after the graph size alignment processing is same as a size of the image data in original form.

After data anonymization processing and data augmentation processing are performed, a plurality of pieces of subgraph data, for example, frequency component channel feature maps, are obtained, and a size of the obtained subgraph data is generally different from a size of input image data of an original image recognition network, e.g., an image recognition model. To adapt to the size of the input image data of the original image recognition network, graph size alignment is performed on the augmented anonymized image data. Graph size alignment processing means performing upsampling or downsampling on a size of each subgraph data, so that the size is the same as an input size of the original image recognition network. After graph size alignment processing, a change of an existing image recognition network is merely a change from a number of original input channels to a number of channels corresponding to the anonymized image data. Then, subsequent processing is performed based on a typical image recognition network. For example, a subsequent training process of an image recognition model and a subsequent image recognition process are performed.

The image data processing method according to the implementations of the present specification is described above with reference to FIG. 1 to FIG. 8. The anonymized image data that is of the image data and that is obtained by using the above method can be provided to the image recognition model to predict a feature vector representation of the image data, or can be provided to the image recognition model for model training. The image recognition model can be any suitable machine learning model.

Figure 9:
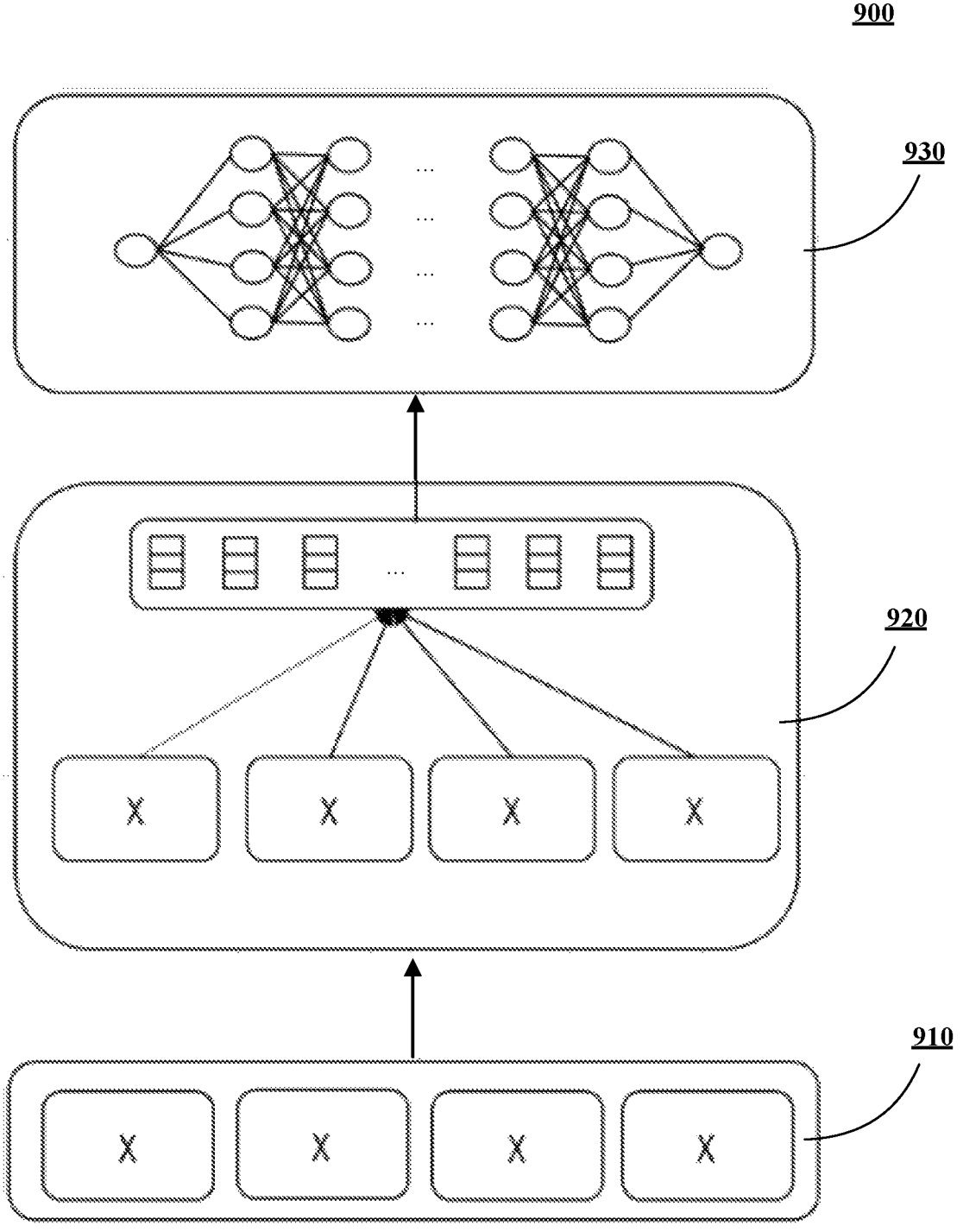
FIG. 9 is a structural diagram illustrating an example of an image recognition model according to an implementation of the present specification.

FIG. 9 is a structural diagram illustrating an example of an image recognition model 900 according to an implementation of the present specification. As shown in FIG. 9, the image recognition model 900 can include an input layer 910, a feature extraction layer 920, and an output layer 930.

The input layer 910 can be used to receive the augmented anonymized image data obtained after image data processing described above with reference to FIG. 2.

In some implementations, the input layer 910 can have a plurality of input channels, a number of the plurality of input channels can be the same as a number of pieces of subgraph data (for example, frequency component channel feature maps) in the anonymized image data, and each channel corresponds to a piece of subgraph data.

In some implementations, a number of input channels of an initially created image recognition model can be adjusted, so that the number of input channels is consistent with the number of pieces of subgraph data obtained through processing by using the above image processing method.

In some implementations, a number of pieces of target subgraph data obtained through screening can be set, so that the number of pieces of subgraph data in the obtained anonymized image data is consistent with a number of channels of an original image recognition model, and a model architecture of the original image recognition model can be used without any adjustment.

The feature extraction layer 920 can be used to process the input anonymized image data to obtain a feature vector representation (or referred to as a predicted vector) of the anonymized image data.

In some implementations, the feature extraction layer can be a deep neural network, such as a convolutional neural network (CNN) or a recurrent neural network (RNN). The feature extraction layer can be used to process (such as perform convolution or pooling on) each feature map to obtain a more abstract feature vector representation.

The output layer 930 can convert the feature vector representation into an identity recognition result of a target object corresponding to the anonymized image data.

The target object can be a living organism or an object in an image, or a part thereof, for example, a person, a face, an animal, or a certain building.

The identity recognition result can be a corresponding identity of the target object in the image, for example, an identity of a person, a category of an animal, or a name of a building.

The output layer can be used to transform the feature vector representation of the anonymized image data to obtain a predicted value. The predicted value can be used to indicate identity information of a person in the image, e.g., the identity recognition result of the target object.

In some implementations, the output layer can be a multi-layer perceptron, a fully connected layer, or the like. This is not limited in the present specification.

Figure 10:
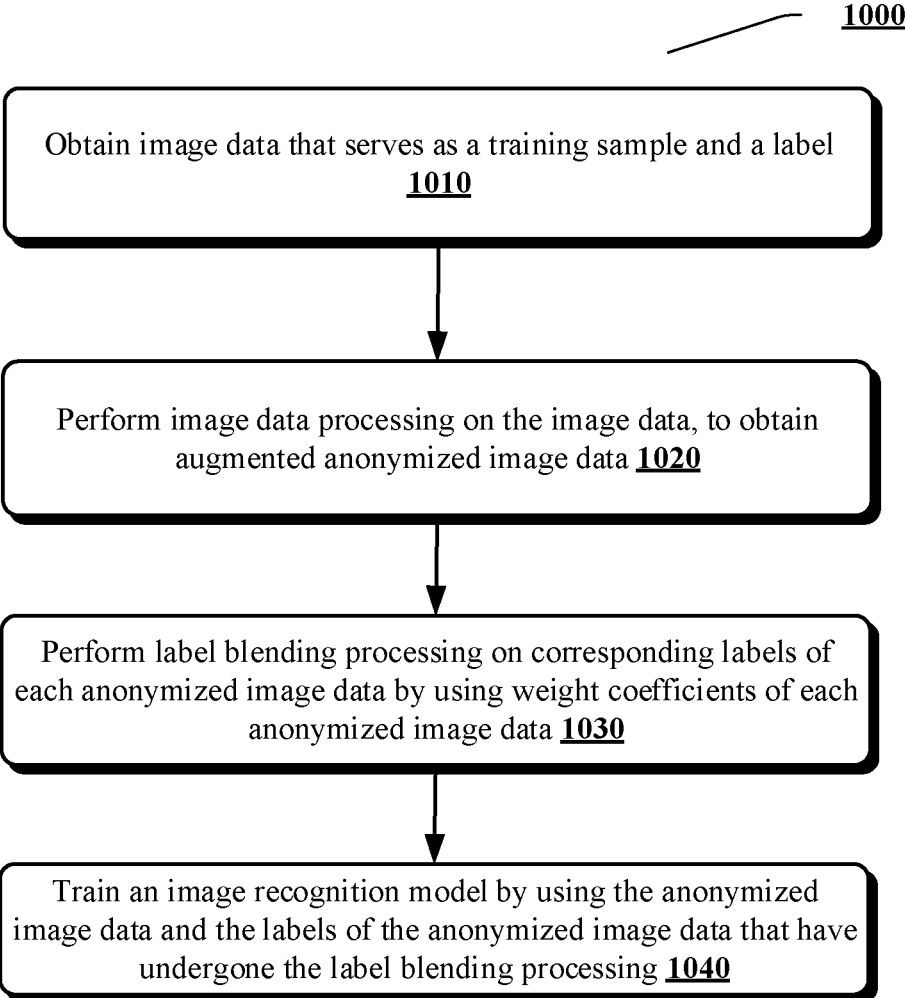
FIG. 10 is a flowchart illustrating an example of a training method for an image recognition model according to an implementation of the present specification.

FIG. 10 is a flowchart illustrating an example of a training method 1000 for an image recognition model according to an implementation of the present specification.

As shown in FIG. 10, at step 1010, image data that serves as a training sample (hereinafter referred to as training sample image data) and a label of the image data are obtained. The training sample image data can include face image data, and the label of the training sample image data can be identity information corresponding to a face in an image, for example, a person name. The label of the training sample image data can be manually added, or can be added in another manner. This is not limited in the present specification. In some implementations, the training sample image data and the label of the training sample image data can be obtained in a manner such as reading from a database or invoking a data interface.

At step 1020, the image data is processed by using the image processing method described above with reference to FIG. 1 to FIG. 8, to obtain augmented anonymized image data. The augmented anonymized image data includes a subgraph data set, and each subgraph data has a weight coefficient.

At step 1030, label blending processing is performed on corresponding labels of subgraph data in each anonymized image data by using weight coefficients of the subgraph data in each anonymized image data.

In some implementations, during label blending processing, if subgraph data in the image blending processing comes from a same category, labels of the subgraph data in the image blending processing remain unchanged. If at least a part of subgraph data in the image blending processing comes from different categories, non-zero values in labels of the subgraph data is adjusted to k non-zero values, and each non-zero value corresponds to a weight coefficient of a piece of subgraph data.

At step 1040, an image recognition model is trained by using the subgraph data in the anonymized image data and the labels of the subgraph data that have undergone the label blending processing.

The training process of the image recognition model is a cyclic processing procedure. In each round of training process, batch training sample image data with a batch size of "batch" is selected from the training sample image data. In the above image blending processing, used blended images are from training sample image data of the same batch. When a number of images in each time of blending is set to k, k−1 times of randomization are performed on training sample image data of an original batch to obtain image data of k batches. An image hypermatrix with a size of batch*k is constructed based on the image data of the k batches, each item in the image hypermatrix corresponds to one image, and the first column corresponds to the image data of the original batch. Next, weight coefficients with a size of batch*k are randomly generated for the image hypermatrix, and each weight coefficient is assigned to an entry. Then, row normalization is performed, so that a sum of each row of coefficients is 1. In addition, a maximum weight coefficient of the row of images should not exceed a specified value $W_{max}$. Subsequently, weighted summation is performed on each row of the image hypermatrix by using the weight coefficients of each row. Finally, a blended image hypermatrix with a size of batch*1 is obtained, thereby completing image blending processing.

In each round of training process, the image recognition model predicts a feature vector representation of the training sample image based on the anonymized image data of the training sample image, and determines a recognition result based on the predicted feature vector representation. For example, when the image data is face image data, a feature similarity between the predicted feature vector representation and each reference feature vector representation can be determined, and a recognition result is determined based on the determined feature similarity, e.g., identity information corresponding to the face. Herein, each reference feature vector representation corresponds to a specific piece of identity information. When the feature similarity between the predicted feature vector representation and a reference feature vector representation is greater than a predetermined threshold, the face image is determined as identity information corresponding to the reference feature vector representation.

In addition, in each round of training process, a corresponding loss function can be constructed based on a recognition result output by the image recognition model and a corresponding label, and a model parameter of the image recognition model can be adjusted based on a value of the loss function, to reduce a difference between the recognition result and the label. As such, training is repeated until a model training end condition is reached, for example, a number of training rounds is reached or a difference between the recognition result and the label satisfies a predetermined requirement.

In some implementations, in some implementations, before the image recognition model is trained by using the anonymized image data and the label that is of the anonymized image data and that has undergone the label blending processing, graph size alignment processing can be further performed on the subgraph data in the anonymized image data, so that a size of each subgraph data after the graph size alignment processing is same as a size of the image data in original form.

FIG. 11 is a flowchart illustrating an example of an image recognition method 1100 according to an implementation of the present specification.

As shown in FIG. 11, at step 1110, image data to be recognized is obtained. The image data to be recognized is an image with a target object to be recognized, for example, a face image or a fingerprint image.

In some implementations, the target object can include, for example, a face corresponding to certain identity information, for example, a face corresponding to identity information of a payment account during facial recognition-based payment, a face corresponding to identity information that has unlocking permission during facial recognition-based unlocking, and a face corresponding to identity information that has login permission during terminal account login.

In some implementations, the processing device can obtain the image data to be recognized by using a camera of the terminal device, or can obtain the image data to be recognized in a manner such as reading from a storage device or a database, or invoking a data interface.

At step 1120, the image data to be recognized is processed by using the above image processing method, to obtain augmented anonymized image data of the image data to be recognized.

At step 1130, the obtained anonymized image data is provided to an image recognition model to predict a feature vector representation of the image data to be recognized.

At step 1140, it is determined, based on the predicted feature vector representation and a feature vector representation of a target object, whether the image data to be recognized includes the target object. For example, a feature similarity between the predicted feature vector representation and the feature vector representation of the target object can be determined, and a recognition result is determined based on the determined feature similarity. For example, when the feature similarity between the predicted feature vector representation and the feature vector representation of the target object is greater than a predetermined threshold, it is considered that the face image includes the target object, so that the face image is recognized as having identity information corresponding to the target object. When the feature similarity between the predicted feature vector representation and the feature vector representation of the target object is not greater than a predetermined threshold, it is considered that the face image does not include the target object, so that the face image is recognized as having no identity information corresponding to the target object.

In some implementations, the feature vector representation of the target object can be pre-stored in a storage device. In some implementations, image data processing described in FIG. 2 can be performed on the face image of the target object in advance to obtain the augmented anonymized image data, then the anonymized image data is processed by using the image recognition model, the predicted feature vector representation output by the feature extraction layer of the model is used as the feature vector representation of the target object, and the feature vector representation of the target object is stored into the storage device.

In some implementations, the feature vector representation of the target object can be obtained in a manner such as reading from a database or a storage device, or invoking a data interface.

In some implementations, when the predicted feature vector representation is compared with the feature vector representation of the target object, a distance between the two feature vector representations can be calculated, for example, a cosine distance or a Euclidean distance. The calculated distance between the two feature vector representations can represent a similarity between the two feature vector representations. If the similarity is greater than a predetermined value (for example, 99% or 99.5%), it can be determined that the image to be recognized includes the target object. If the similarity is not greater than the predetermined value, it can be determined that the image to be recognized does not include the target object.

In some implementations, the above steps can be performed in a trusted execution environment, to ensure that the entire process from image acquisition to image recognition is in a secure and trusted environment, thereby avoiding leaking image and anonymized image data.

It should be noted that the image recognition method 1100 shown in FIG. 11 can be performed by a terminal device or a server. In addition, the image recognition model can be deployed in a terminal device or a server.

It should be noted that descriptions of the above processes are merely used for illustration and description, and constitute no limitation on the application scope of the implementations of the present specification. A person skilled in the art can make various modifications and changes to the processes under the guidance of the present specification. However, these modifications and changes still fall within the scope of the implementations of the present specification, for example, changes of steps of a related process in the implementations of the present specification, such as adding a preprocessing step and a storage step.

FIG. 12 is a block diagram illustrating an example of an image data processing apparatus 1200 according to an implementation of the present specification. As shown in FIG. 12, the image data processing apparatus 1200 includes a data anonymization processing unit 1210 and an image blending processing unit 1220.

The data anonymization processing unit 1210 is configured to perform data anonymization processing on image data based on frequency domain transform to obtain anonymized image data of the image data, the obtained anonymized image data including a subgraph data set, and each subgraph data in the subgraph data set corresponding to a different frequency. For an operation of the data anonymization processing unit 1210, references can be made to the operation described above with reference to step 210 in FIG. 2.

The image blending processing unit 1220 is configured to perform image blending processing on the subgraph data in the obtained anonymized image data based on data augmentation, to obtain augmented anonymized image data. For an operation of the image blending processing unit 1220, references can be made to the operation described above with reference to step 220 in FIG. 2.

In some implementations, the image data processing apparatus 1200 can further include a graph size alignment unit 1230. The graph size alignment unit 1230 is configured to perform graph size alignment processing on each subgraph data in the augmented anonymized image data, so that a size of each subgraph data after the graph size alignment processing is same as a size of the image data in original form. For an operation of the graph size alignment unit 1230, references can be made to the operation described above with reference to step 230 in FIG. 2.

FIG. 13 is a block diagram illustrating an example of a data anonymization processing unit 1300 according to an implementation of the present specification. As shown in FIG. 13, the data anonymization processing unit 1300 includes a local frequency domain transform module 1310, a channel feature map construction module 1320, and a feature map screening module 1330.

The local frequency domain transform module 1310 is configured to perform local frequency domain transform processing on the image data to obtain at least one feature map, where each feature map of the at least one feature map includes a plurality of elements and corresponds to a data block in the image data, and each element of the plurality of elements corresponds to a frequency in the frequency domain. For an operation of the local frequency domain transform module 1310, references can be made to the operation described above with reference to step 310 in FIG. 3.

The channel feature map construction module 1320 is configured to construct, by using elements corresponding to frequencies in the at least one feature map, frequency component channel feature maps corresponding to the frequencies, respectively. For an operation of the channel feature map construction module 1320, references can be made to the operation described above with reference to step 320 in FIG. 3.

The feature map screening module 1330 is configured to obtain at least one target frequency component channel feature map from the constructed frequency component channel feature maps through screening, to obtain the anonymized image data of the image data, where the target frequency component channel feature map obtained through screening is a key channel feature for image recognition. For an operation of the feature map screening module 1330, references can be made to the operation described above with reference to step 330 in FIG. 3.

FIG. 14 is a block diagram illustrating an example of a data anonymization processing unit 1400 according to an implementation of the present specification. As shown in FIG. 14, the data anonymization processing unit 1400 includes a local frequency domain transform module 1410, a channel feature map construction module 1420, a feature map screening module 1430, a first shuffle module 1440, a first normalization processing module 1450, a channel blending processing module 1460, a second shuffle module 1470, and a second normalization processing module 1480.

The local frequency domain transform module 1410 is configured to perform local frequency domain transform processing on the image data to obtain at least one feature map, where each feature map of the at least one feature map includes a plurality of elements and corresponds to a data block in the image data, and each element of the plurality of elements corresponds to a frequency in the frequency domain. For an operation of the local frequency domain transform module 1410, references can be made to the operation described above with reference to step 710 in FIG. 7.

The channel feature map construction module 1420 is configured to construct, by using elements corresponding to frequencies in the at least one feature map, frequency component channel feature maps corresponding to the frequencies, respectively. For an operation of the channel feature map construction module 1420, references can be made to the operation described above with reference to step 720 in FIG. 7.

The feature map screening module 1430 is configured to obtain at least one target frequency component channel feature map from the constructed frequency component channel feature maps through screening, where the target frequency component channel feature map obtained through screening is a key channel feature for image recognition. In some implementations, the feature map screening module 1430 can obtain the at least one target frequency component channel feature map from the constructed frequency component channel feature maps through screening based on channel importance or a predetermined screening rule. For an operation of the feature map screening module 1430, references can be made to the operation described above with reference to step 730 in FIG. 7.

The first shuffle module 1440 is configured to perform the first shuffle processing on the target frequency component channel feature map to obtain a first shuffled feature map. The first normalization processing module 1450 is configured to perform normalization processing on the first shuffled feature map. For operations of the first shuffle module 1440 and the first normalization processing module 1450, references can be made to the operations described above with reference to step 740 in FIG. 7.

The channel blending processing module 1460 is configured to perform channel blending processing on the first shuffled feature map that has undergone the normalization processing. For an operation of the channel blending processing module 1460, references can be made to the operation described above with reference to step 750 in FIG. 7.

The second shuffle module 1470 is configured to perform a second shuffle processing on the first shuffled feature map that has undergone the channel blending processing, to obtain a second shuffled feature map. The second normalization processing module 1480 is configured to perform normalization processing on the second shuffled feature map. For operations of the first shuffle module 1470 and the second normalization processing module 1480, references can be made to the operations described above with reference to step 760 in FIG. 7.

FIG. 15 is a block diagram illustrating an example of an image blending processing unit 1500 according to an implementation of the present specification. As shown in FIG. 15, the image blending processing unit 1500 includes an image disarrangement module 1510, an image hypermatrix construction module 1520, a weight coefficient generation module 1530, a weight coefficient normalization module 1540, and an image blending processing module 1550.

The image disarrangement module 1510 is configured to perform k−1 times of shuffle processing on the subgraph data set of the anonymized image data to obtain k subgraph data sets. For an operation of the image disarrangement module 1510, references can be made to the operation described above with reference to step 810 in FIG. 8.

The image hypermatrix construction module 1520 is configured to construct an image hypermatrix with a size of m*k based on the obtained k subgraph data sets, where the first column in the constructed image hypermatrix corresponds to an original subgraph data set, and m is a number of pieces of subgraph data in the original subgraph data set. For an operation of the image hypermatrix construction module 1520, references can be made to the operation described above with reference to step 820 in FIG. 8.

The weight coefficient generation module 1530 is configured to randomly generate a weight coefficient for each image in the image hypermatrix. For an operation of the weight coefficient generation module 1530, references can be made to the operation described above with reference to step 830 in FIG. 8.

The weight coefficient normalization module 1540 is configured to perform row normalization on the weight coefficients of the images in the image hypermatrix, so that a sum of the weight coefficients of each row of images is 1, and a maximum coefficient of each image is not greater than $W_{max}$. For an operation of the weight coefficient normalization module 1540, references can be made to the operation described above with reference to step 840 in FIG. 8.

The image blending processing module 1550 is configured to perform weighted summation on each row of images of the image hypermatrix to obtain a blended image hypermatrix with a size of m*1, where an image in the obtained blended image hypermatrix is augmented anonymized image data. For an operation of the image blending processing module 1550, references can be made to the operation described above with reference to step 850 in FIG. 8.

Figure 16:
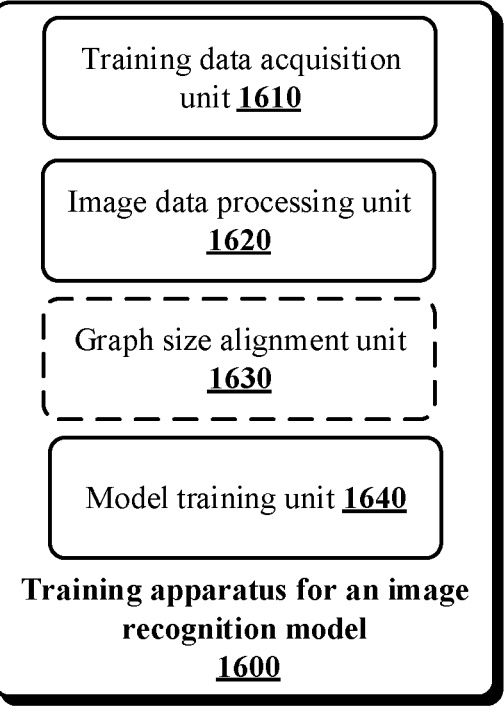
FIG. 16 is a block diagram illustrating an example of a training apparatus for an image recognition model according to an implementation of the present specification.

FIG. 16 is a block diagram illustrating an example of a training apparatus 1600 for an image recognition model according to an implementation of the present specification. As shown in FIG. 16, the training apparatus 1600 for an image recognition model includes a training data acquisition unit 1610, an image data processing unit 1620, and a model training unit 1640.

The training data acquisition unit 1610 is configured to obtain image data that serves as a training sample and a label of the image data. For the operation of the training data acquisition unit 1610, references can be made to the operation described above with reference to step 1010 in FIG. 10.

The image processing unit 1620 is configured to process the image data by using the image data processing method described in FIG. 2, to obtain augmented anonymized image data of the face image data, the augmented anonymized image data including a subgraph data set, and each subgraph data having a weight coefficient; and perform label blending processing on corresponding labels of subgraph data in each anonymized image data by using weight coefficients of the subgraph data in each anonymized image data. For an operation of the image processing unit 1620, references can be made to the operations described with reference to step 1020 and step 1030 in FIG. 10.

The model training unit 1640 is configured to train an image recognition model by using the subgraph data in the anonymized image data and the labels of the subgraph data that have undergone the label blending processing. For an operation of the model training unit 1640, references can be made to the operation described above with reference to step 1040 in FIG. 10.

In some implementations, the training apparatus 1600 for an image recognition model can further include a graph size alignment unit 1630. The graph size alignment unit 1630 is configured to perform graph size alignment processing on each subgraph data in the augmented anonymized image data, so that a size of each subgraph data after the graph size alignment processing is same as a size of the image data in original form. Correspondingly, the model training unit 1640 is configured to train the image recognition model by using the anonymized image data that have undergone the graph size alignment and the labels of the anonymized image data that have undergone the label blending processing.

FIG. 17 is a block diagram illustrating an example of an image recognition apparatus 1700 according to an implementation of the present specification. As shown in FIG. 17, the image recognition apparatus 1700 includes an image data acquisition unit 1710, an image data processing unit 1720, a feature vector representation prediction unit 1740, and an image recognition unit 1750.

The image data acquisition unit 1710 is configured to obtain image data to be recognized. For the operation of the image data acquisition unit 1710, references can be made to the operation described above with reference to step 1110 in FIG. 11.

The image data processing unit 1720 is configured to process the image data by using the image data method described above, to obtain augmented anonymized image data of the image data. For the operation of the image data processing unit 1720, references can be made to the operation described above with reference to step 1120 in FIG. 11.

The feature vector representation prediction unit 1740 is configured to provide the anonymized image data to an image recognition model to predict a feature vector representation of the image data. For an operation of the feature vector representation prediction unit 1740, references can be made to the operation described above with reference to step 1130 in FIG. 11.

The image recognition unit 1750 is configured to determine, based on the predicted feature vector representation and a feature vector representation of a target object, whether the image data to be recognized includes the target object. For an operation of the image recognition unit 1750, references can be made to the operation described above with reference to step 1140 in FIG. 11.

In some implementations, the image recognition apparatus 1700 can further include a graph size alignment unit 1730. The graph size alignment unit 1730 is configured to perform graph size alignment processing on each subgraph data in the augmented anonymized image data, so that a size of each subgraph data after the graph size alignment processing is same as a size of the image data in original form. Correspondingly, the feature vector representation prediction unit 1740 is configured to provide the anonymized image data that have undergone the graph size alignment to an image recognition model to predict a feature vector representation of the image data.

The image data processing method, the image data processing apparatus, the training method for an image recognition model, the training apparatus for an image recognition model, the image recognition method, and the image recognition apparatus according to the implementations of the present specification are described above with reference to FIG. 1 to FIG. 17. The above image data processing apparatus, the above training apparatus for an image recognition model, and the above image recognition apparatus can be implemented by using hardware, or can be implemented by using software or a combination of hardware and software.

Figure 18:
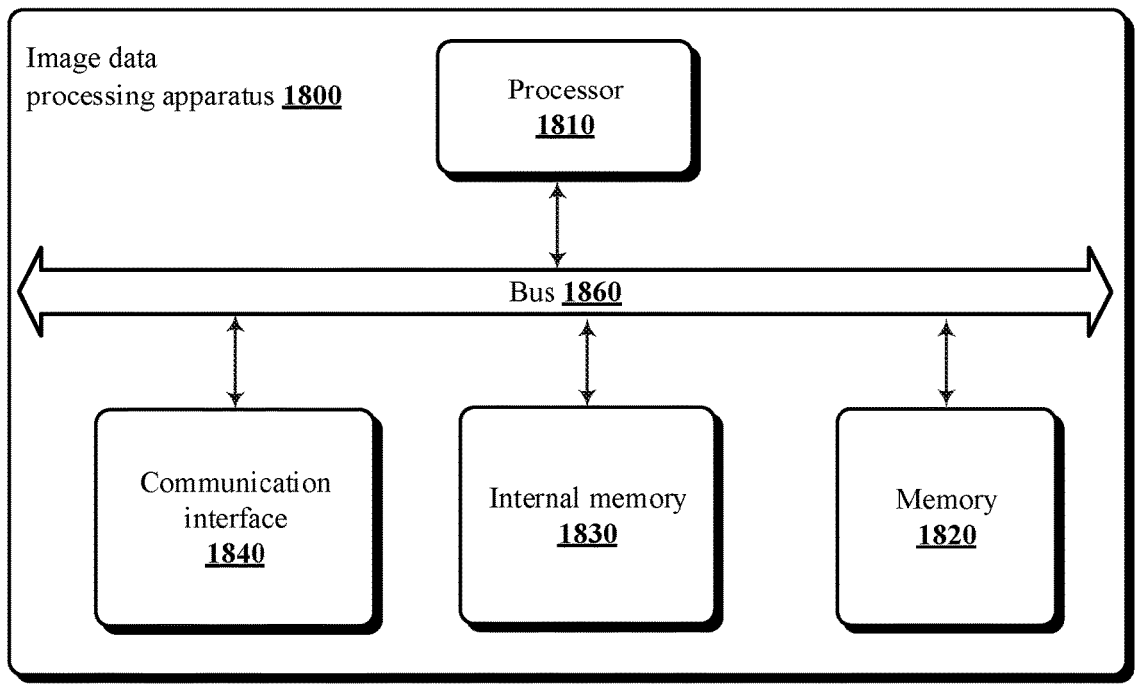
FIG. 18 is a schematic diagram illustrating an example of an image data processing apparatus implemented based on a computer system according to an implementation of the present specification.

FIG. 18 is a schematic diagram illustrating an example of an image data processing apparatus 1800 implemented based on a computer system according to an implementation of the present specification. As shown in FIG. 18, the image data processing apparatus 1800 can include at least one processor 1810, a memory (for example, a non-volatile memory) 1820, an internal memory 1830, and a communication interface 1840, and the at least one processor 1810, the memory 1820, the internal memory 1830, and the communication interface 1840 are connected together by using a bus 1860. The at least one processor 1810 executes at least one computer-readable instruction (for example, the above element implemented in a form of software) stored or encoded in the memory.

In an implementation, computer-executable instructions are stored in the memory, and the computer-executable instructions are executed to cause the at least one processor 1810 to perform the following operations: performing data anonymization processing on image data based on frequency domain transform to obtain anonymized image data of the image data, the obtained anonymized image data including a subgraph data set, and each subgraph data in the subgraph data set corresponding to a different frequency; and performing image blending processing on the subgraph data in the obtained anonymized image data based on data augmentation, to obtain augmented anonymized image data.

It should be understood that when the computer-executable instructions stored in the memory are executed, the at least one processor 1810 is enabled to perform the various operations and functions described above with reference to FIG. 1 to FIG. 8 and FIG. 12 to FIG. 15 in the implementations of the present specification.

Figure 19:
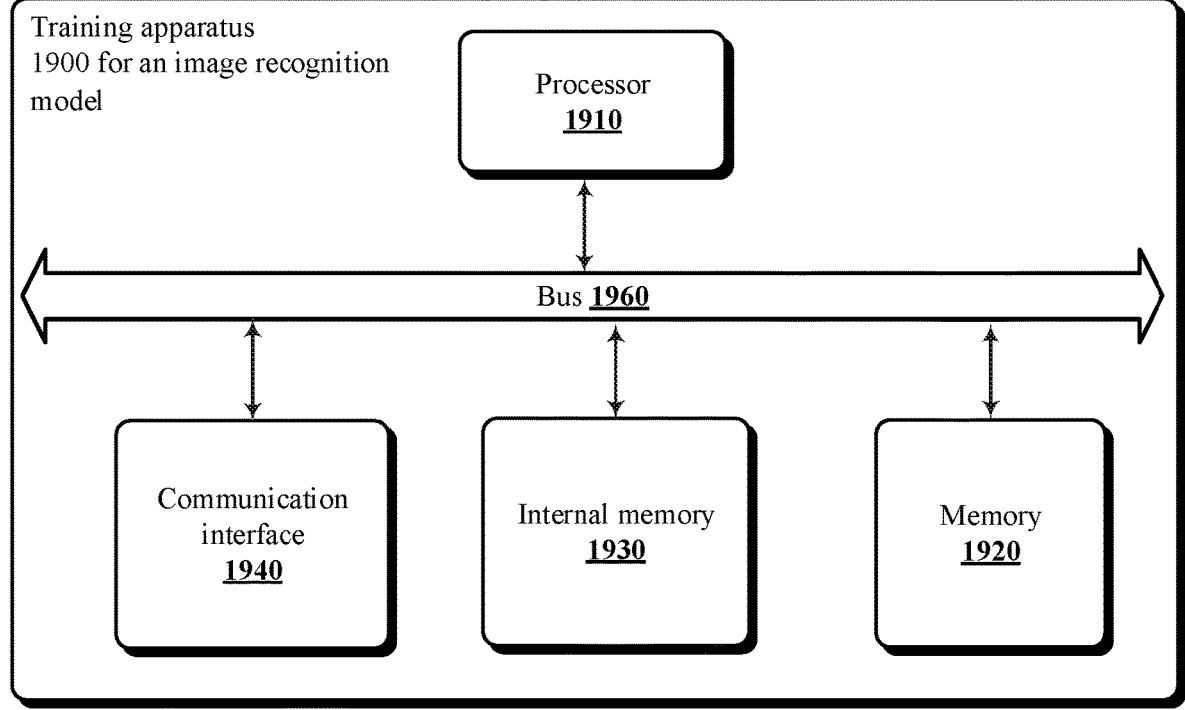
FIG. 19 is a schematic diagram illustrating an example of a training apparatus for an image recognition model implemented based on a computer system according to an implementation of the present specification.

FIG. 19 is a schematic diagram illustrating an example of a training apparatus 1900 for an image recognition model implemented based on a computer system according to an implementation of the present specification. As shown in FIG. 19, the training apparatus 1900 for an image recognition model can include at least one processor 1910, a memory (for example, a non-volatile memory) 1920, an internal memory 1930, and a communication interface 1940, and the at least one processor 1910, the memory 1920, the internal memory 1930, and the communication interface 1940 are connected together by using a bus 1960. The at least one processor 1910 executes at least one computer-readable instruction (for example, the above element implemented in a form of software) stored or encoded in the memory.

In an implementation, computer-executable instructions are stored in the memory, and the computer-executable instructions are executed to cause the at least one processor 1910 to perform the following operations: obtaining image data that serves as a training sample and a label of the image data; processing the image data by using the above method, to obtain augmented anonymized image data of the image data; performing label blending processing on corresponding labels of each anonymized image data by using weight coefficients of each anonymized image data; and training an image recognition model by using the anonymized image data and the labels of the anonymized image data that have undergone the label blending processing.

It should be understood that when the computer-executable instructions stored in the memory are executed, the at least one processor 1910 is enabled to perform the various operations and functions described above with reference to FIG. 9, FIG. 10, and FIG. 16 in the implementations of the present specification.

Figure 20:
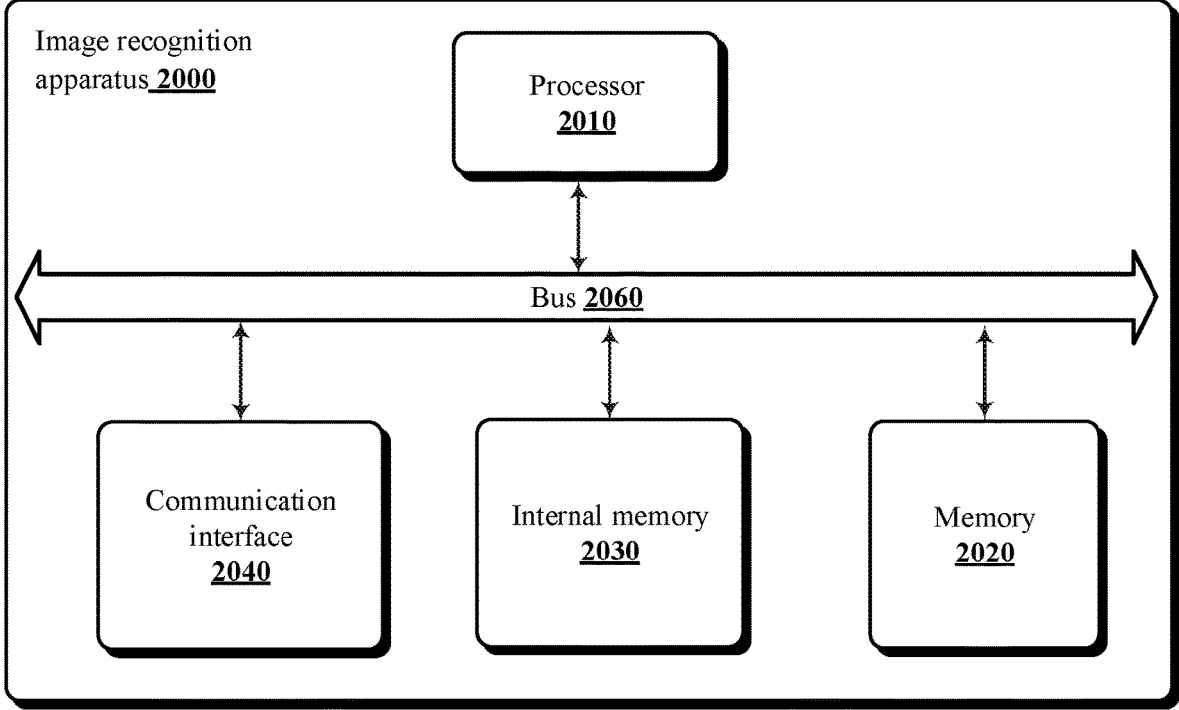
FIG. 20 is a schematic diagram illustrating an example of an image recognition apparatus implemented based on a computer system according to an implementation of the present specification.

FIG. 20 is a schematic diagram illustrating an example of an image recognition apparatus 2000 implemented based on a computer system according to an implementation of the present specification. As shown in FIG. 20, the image recognition apparatus 2000 can include at least one processor 2010, a memory (for example, a non-volatile memory) 2020, an internal memory 2030, and a communication interface 2040, and the at least one processor 2010, the memory 2020, the internal memory 2030, and the communication interface 2040 are connected together by using a bus 2060. The at least one processor 2010 executes at least one computer-readable instruction (for example, the above element implemented in a form of software) stored or encoded in the memory.

In an implementation, computer-executable instructions are stored in the memory, and the computer-executable instructions are executed to cause the at least one processor 2010 to perform the following operations: obtaining image data to be recognized; processing the image data by using the above method, to obtain augmented anonymized image data of the image data; providing the anonymized image data to an image recognition model to predict a predicted feature vector representation of the image data; and determining, based on the predicted feature vector representation and a feature vector representation of a target object, whether the image data to be recognized includes the target object.

It should be understood that when the computer-executable instructions stored in the memory are executed, the at least one processor 2010 is enabled to perform the various operations and functions described above with reference to FIG. 11 and FIG. 17 in the implementations of the present specification.

According to an implementation, a program product such as a machine-readable medium (for example, a non-transitory machine-readable medium) is provided. The machine-readable medium can have instructions (e.g., the elements implemented in a form of software). When the instructions are executed by a machine, the machine is enabled to perform the various operations and functions described above with reference to FIG. 1 to FIG. 17 in the implementations of the present specification. For example, a system or an apparatus equipped with a readable storage medium can be provided, and software program code for implementing a function of any one of the implementations is stored in the readable storage medium, so that a computer or a processor of the system or the apparatus reads and executes the instructions stored in the readable storage medium.

In this case, the program code read from the readable medium can implement a function of any one of the implementations. Therefore, the machine readable code and the readable storage medium that stores the machine readable code constitute a part of the present disclosure.

Implementations of the readable storage medium include a floppy disk, a hard disk, a magnetic disk, an optical disc (such as a compact disc read-only memory (CD-ROM), a compact disc-recordable (CD-R), a compact disc-rewritable (CD-RW), a digital versatile disc-read-only memory (DVD-ROM), a digital versatile disc-random access memory (DVD-RAM), a digital versatile disc-rewritable (DVD-RW), a digital versatile disc-rewritable (DVD-RW)), a magnetic tape, a non-volatile memory card, and a ROM. In some implementations, program code can be downloaded from a server computer or cloud by a communication network.

According to an implementation, a computer program product is provided. The computer program product includes a computer program, and when the computer program is executed by a processor or processors, the processor (or processors) is caused to, individually or collectively, perform various operations and functions described above with reference to FIG. 1 to FIG. 17 in the implementations of the present specification.

It should be understood by a person skilled in the art that various changes and modifications can be made to the implementations disclosed above without departing from the spirit of the present invention. Therefore, the protection scope of the present application should be defined by the appended claims.

It should be noted that not all the steps and units in the above processes and system block diagrams are mandatory, and some steps or units can be ignored as actually needed. An execution sequence of the steps is not fixed, and can be determined as needed. The apparatus structures described in the above implementations can be physical structures or logical structures. For example, some units can be implemented by the same physical entity, or some units can be respectively implemented by a plurality of physical entities, or can be jointly implemented by some components in a plurality of independent devices.

In the above implementations, the hardware units or modules can be implemented mechanically or electrically. For example, a hardware unit, module, or processor can include dedicated permanent circuitry or logic (for example, a dedicated processor, an FPGA, or an ASIC) for performing a corresponding operation. The hardware unit or processor can further include programmable logic or circuitry (for example, a general-purpose processor or another programmable processor), and can be temporarily arranged by software to perform a corresponding operation. A specific implementation (a mechanical method, a dedicated permanent circuitry, or a temporarily arranged circuitry) can be determined based on costs and time considerations.

Example implementations are described in the implementations described above with reference to the accompanying drawings, but do not represent all implementations that can be practiced or fall within the protection scope of the claims. The term "for example" used throughout the present specification means "being used as an example, an instance, or an illustration", and does not mean "being more preferred" or "being more advantageous" than other implementations. Specific implementations include specific details for the purpose of providing an understanding of the described technologies. However, these technologies can be practiced without these specific details. In some instances, well-known structures and apparatuses are shown in a form of block diagrams to avoid obscuring the concepts of the described implementations.

The above descriptions of the content of the present disclosure are provided to cause any person of ordinary skill in the art to implement or use the content of the present disclosure. Various modifications to the content of the present disclosure are apparent to a person of ordinary skill in the art, and the general principles defined herein can be applied to other variations without departing from the protection scope of the content of the present disclosure. Therefore, the content of the present disclosure is not limited to the examples and designs described herein, but is consistent with the widest scope in accordance with the principles and novel features disclosed herein.

What is claimed is:

1. A method, comprising:
obtaining image data as a training sample and labels of the image data;
performing data anonymization processing on the image data based on frequency domain transform to obtain anonymized image data of the image data, the anonymized image data including a first subgraph data set, and each subgraph data in the first subgraph data set corresponding to a different frequency; and
performing image blending processing on the subgraph data in the anonymized image data based on data augmentation, to obtain augmented anonymized image data,
obtaining a weight coefficient for each piece of subgraph data in the augmented anonymized image data;
performing label blending processing on labels corresponding to subgraph data in the anonymized image data by using weight coefficients of the subgraph data in the anonymized image data; and
training an image recognition model by using the subgraph data in the anonymized image data and the labels of the subgraph data that have been label blending processed.

2. The method according to claim 1, wherein the data augmentation includes one or more of:
mixup data augmentation; or
instahide data augmentation.

3. The method according to claim 2, wherein the data augmentation includes mixup data augmentation, a number of images used for the image blending processing is k, and a maximum weight coefficient for blending image is $W_{max}$; and
the performing image blending processing on the subgraph data in the anonymized image data based on data augmentation includes:
performing k–1 times of disarrangement processing on the first subgraph data set of the anonymized image data to obtain k subgraph data sets including the first subgraph data set;
constructing an image hypermatrix with a size of m*k based on the k subgraph data sets, wherein a first column in the image hypermatrix corresponds to the first subgraph data set, and m is a number of pieces of subgraph data in the first subgraph data set;
randomly generating a weight coefficient for each image in the image hypermatrix;
performing row normalization on weight coefficients of images in the image hypermatrix, so that a sum of weight coefficients of each row of images is 1, and a weight coefficient of each image is not greater than $W_{max}$; and
performing weighted summation on a row of images of the image hypermatrix to obtain a blended image hypermatrix with a size of m*1, wherein images in the blended image hypermatrix are the augmented anonymized image data.

4. The method according to claim 3, wherein $W_{max}$ is 0.55, and k is 3.

5. The method according to claim 1, further comprising:
performing graph size alignment processing on subgraph data in the augmented anonymized image data.

6. The method according to claim 1, wherein the performing data anonymization processing on the image data based on frequency domain transform includes:
performing local frequency domain transform processing on the image data to obtain at least one feature map, wherein each feature map of the at least one feature map includes a plurality of elements and corresponds to a data block in the image data, and each element of the plurality of elements corresponds to a frequency in the frequency domain;
constructing, by using elements corresponding to frequencies in the at least one feature map, frequency component channel feature maps corresponding to the frequencies, respectively; and
obtaining at least one target frequency component channel feature map from the frequency component channel feature maps through screening, to obtain the anonymized image data of the image data, wherein a target frequency component channel feature map of the at least one target frequency component feature map is a channel feature for image recognition.

7. The method according to claim 6, further comprising:
after the obtaining the at least one target frequency component channel feature map from the frequency component channel feature maps through screening,
performing a first shuffle processing on a target frequency component channel feature map to obtain a first shuffled feature map; and performing normalization processing on the first shuffled feature map.

8. The method according to claim 6, wherein the obtaining the at least one target frequency component channel feature map from the frequency component channel feature maps through screening includes:

obtaining the at least one target frequency component channel feature map from the frequency component channel feature maps through screening based on one or more of channel importance or a screening rule.

9. The method according to claim 7, further comprising:

after the performing normalization processing on the first shuffled feature map, performing channel blending processing on the first shuffled feature map that has been normalization processed;

performing a second shuffle processing on the first shuffled feature map that has been channel blending processed, to obtain a second shuffled feature map; and performing normalization processing on the second shuffled feature map to obtain the anonymized image data of the image data.

10. The method according to claim 9, wherein the performing channel blending processing on the first shuffled feature map includes:

performing channel blending on two adjacent frequency component channel feature maps in the first shuffled feature map.

11. The method according to claim 1, wherein the image data includes face image data.

12. The according to claim 1, wherein in response to that subgraph data in the image blending processing comes from a same category, labels of the subgraph data in the image blending processing remain unchanged, and in response to that at least a part of subgraph data in the image blending processing comes from different categories, non-zero values in labels of the subgraph data are adjusted to k non-zero values, and each non-zero value corresponds to a weight coefficient of a piece of subgraph data.

13. The method according to claim 1, further comprising:

obtaining first image data as an image to be recognized;

performing the data anonymization processing on the first image data to obtain anonymized first image data;

providing the anonymized first image data to the image recognition model to predict a feature vector representation of the first image data; and determining, based on the predicted feature vector representation and a feature vector representation of a target object, whether the image to be recognized includes the target object.

14. The method according to claim 13, wherein the first image data includes face image data, and the target object includes face image data with identity information.

15. A computer system, comprising:

one or more processors;

one or more storage devices coupled to the one or more processors, the one or more storage devices, individually or collective, having executable instructions stored thereon, which when executed by the one or more processors, enable the one or more processors to, individually or collectively, implement acts including:

performing data anonymization processing on image data based on frequency domain transform to obtain anonymized image data of the image data, the anonymized image data including a first subgraph data set, and each subgraph data in the first subgraph data set corresponding to a different frequency; and performing image blending processing on the subgraph data in the anonymized image data based on data augmentation, to obtain augmented anonymized image data, wherein the performing data anonymization processing on the image data based on frequency domain transform includes:

performing local frequency domain transform processing on the image data to obtain at least one feature map, wherein each feature map of the at least one feature map includes a plurality of elements and corresponds to a data block in the image data, and each element of the plurality of elements corresponds to a frequency in the frequency domain, constructing, by using elements corresponding to frequencies in the at least one feature map, frequency component channel feature maps corresponding to the frequencies, respectively; and obtaining at least one target frequency component channel feature map from the frequency component channel feature maps through screening, to obtain the anonymized image data of the image data, wherein a target frequency component channel feature map of the at least one target frequency component feature map is a channel feature for image recognition.

16. The computer system according to claim 15, wherein the data augmentation includes mixup data augmentation, a number of images used for the image blending processing is k, and a maximum weight coefficient for blending image is $W_{max}$; and the performing image blending processing on the subgraph data in the anonymized image data based on data augmentation includes:

performing k−1 times of disarrangement processing on the first subgraph data set of the anonymized image data to obtain k subgraph data sets including the first subgraph data set;

constructing an image hypermatrix with a size of m*k based on the k subgraph data sets, wherein a first column in the image hypermatrix corresponds to the first subgraph data set, and m is a number of pieces of subgraph data in the first subgraph data set;

randomly generating a weight coefficient for each image in the image hypermatrix;

performing row normalization on weight coefficients of images in the image hypermatrix, so that a sum of weight coefficients of each row of images is 1, and a weight coefficient of each image is not greater than $W_{max}$; and performing weighted summation on a row of images of the image hypermatrix to obtain a blended image hypermatrix with a size of m*1, wherein images in the blended image hypermatrix are the augmented anonymized image data.

17. The computer system according to claim 15, further comprising:

after the obtaining the at least one target frequency component channel feature map from the frequency component channel feature maps through screening, performing a first shuffle processing on a target frequency component channel feature map to obtain a first shuffled feature map; and performing normalization processing on the first shuffled feature map.

18. A non-transitory storage medium having executable instructions stored thereon, the executable instructions, when executed by one or more processors, enabling the one or more processors to, individually or collectively, implement acts comprising:

one or more processors;

one or more storage devices coupled to the one or more processors, the one or more storage devices, individually or collective, having, which when executed by the one or more processors, enable the one or more processors to, individually or collectively, implement acts including:

performing data anonymization processing on image data based on frequency domain transform to obtain anonymized image data of the image data, the anonymized image data including a first subgraph data set, and each subgraph data in the first subgraph data set corresponding to a different frequency; and performing image blending processing on the subgraph data in the anonymized image data based on data augmentation, to obtain augmented anonymized image data, wherein the data augmentation includes mixup data augmentation, a number of images used for the image blending processing is k, and a maximum weight coefficient for blending image is $W_{max}$; and the performing image blending processing on the subgraph data in the anonymized image data based on data augmentation includes:

performing k−1 times of disarrangement processing on the first subgraph data set of the anonymized image data to obtain k subgraph data sets including the first subgraph data set;

constructing an image hypermatrix with a size of m*k based on the k subgraph data sets, wherein a first column in the image hypermatrix corresponds to the first subgraph data set, and m is a number of pieces of subgraph data in the first subgraph data set;

randomly generating a weight coefficient for each image in the image hypermatrix;

performing row normalization on weight coefficients of images in the image hypermatrix, so that a sum of weight coefficients of each row of images is 1, and a weight coefficient of each image is not greater than $W_{max}$; and performing weighted summation on a row of images of the image hypermatrix to obtain a blended image hypermatrix with a size of m*1, wherein images in the blended image hypermatrix are the augmented anonymized image data.

19. The non-transitory storage medium according to claim 18, wherein the acts include:

obtaining the image data as a training sample and labels of the image data;

obtaining a weight coefficient for each piece of subgraph data in the augmented anonymized image data;

performing label blending processing on labels corresponding to subgraph data in the anonymized image data by using weight coefficients of the subgraph data in the anonymized image data; and training an image recognition model by using the subgraph data in the anonymized image data and the labels of the subgraph data that have been label blending processed.

20. The non-transitory storage medium according to claim 18, wherein the performing data anonymization processing on the image data based on frequency domain transform includes:

performing local frequency domain transform processing on the image data to obtain at least one feature map, wherein each feature map of the at least one feature map includes a plurality of elements and corresponds to a data block in the image data, and each element of the plurality of elements corresponds to a frequency in the frequency domain;

constructing, by using elements corresponding to frequencies in the at least one feature map, frequency component channel feature maps corresponding to the frequencies, respectively; and obtaining at least one target frequency component channel feature map from the frequency component channel feature maps through screening, to obtain the anonymized image data of the image data, wherein a target frequency component channel feature map of the at least one target frequency component feature map is a channel feature for image recognition.

\* \* \* \* \*